(12) United States Patent
Hutton et al.

(10) Patent No.: US 6,907,635 B2
(45) Date of Patent: Jun. 21, 2005

(54) BEACON DOCKING SYSTEM WITH VISUAL GUIDANCE DISPLAY

(75) Inventors: Neil Hutton, Ottawa (CA); Rami Ibrahim, Kanata (CA)

(73) Assignee: DEW Engineering and Development Limited, Ottawa (CA)

(*) Notice: Subject to any disclaimer, the term of this patent is extended or adjusted under 35 U.S.C. 154(b) by 77 days.

(21) Appl. No.: 10/394,242

(22) Filed: Mar. 24, 2003

(65) Prior Publication Data

US 2003/0208861 A1 Nov. 13, 2003

Related U.S. Application Data

(63) Continuation-in-part of application No. 10/139,376, filed on May 7, 2002, now Pat. No. 6,637,063.

(51) Int. Cl.[7] ................................................ E01D 1/00
(52) U.S. Cl. ......................................... 14/71.5; 14/71.3
(58) Field of Search .............................. 14/69.5, 71.1, 14/71.3, 71.5; 250/206.1, 216, 224, 559.29; 340/686.1, 686.2, 942

(56) References Cited

U.S. PATENT DOCUMENTS 3,683,440 A * 8/1972 Xenakis et al. .............. 14/71.5
5,105,495 A * 4/1992 Larson et al. ............... 14/71.5
5,226,204 A * 7/1993 Schoenberger et al. ...... 14/71.5
5,257,431 A * 11/1993 Larson et al. ............... 14/71.5
6,552,327 B2 * 4/2003 Anderberg ................... 250/221

FOREIGN PATENT DOCUMENTS

| GB | 2 118 502 | * | 4/1982 |
| WO | WO 96/08411 A1 | | 3/1996 |
| WO | WO 01/34467 A1 | | 5/2001 |

OTHER PUBLICATIONS

Fabriksmonteringin Trelleborg AB website: http://www-.fmt.se (pages of particular relevance attached).
"APIS ++ Aircraft Parking and Information System" brochure, FMT Aircraft Gate Support Systems AB, Sweden.

* cited by examiner

Primary Examiner—Gary S. Hartmann
(74) Attorney, Agent, or Firm—Freedman & Associates

(57) ABSTRACT

Disclosed is a system and method for automatically aligning an end of a passenger boarding bridge with a doorway of an aircraft. A beacon is transmitted from a predetermined location aboard the aircraft, such as within a window proximate a doorway of the aircraft. The beacon is sensed and from the sensed beacon a direction for moving of the end of the passenger boarding bridge is determined. The passenger boarding bridge is then moved according to the determined direction. The process is iterated until the docking of the bridge to the aircraft is completed.

20 Claims, 22 Drawing Sheets

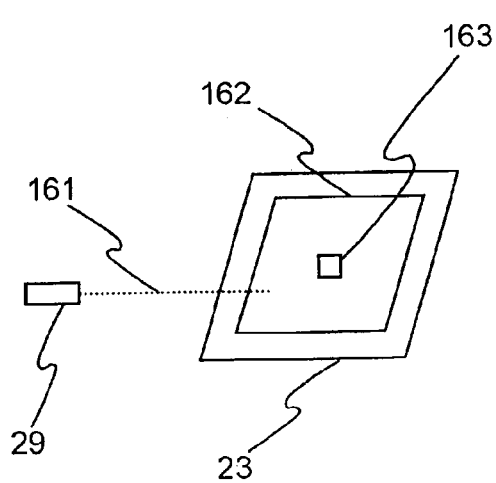 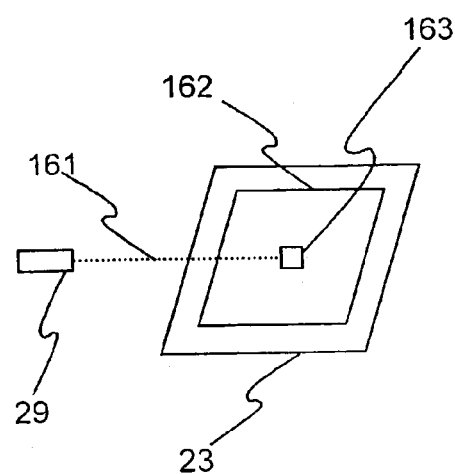
Figure 17a                Figure 17b
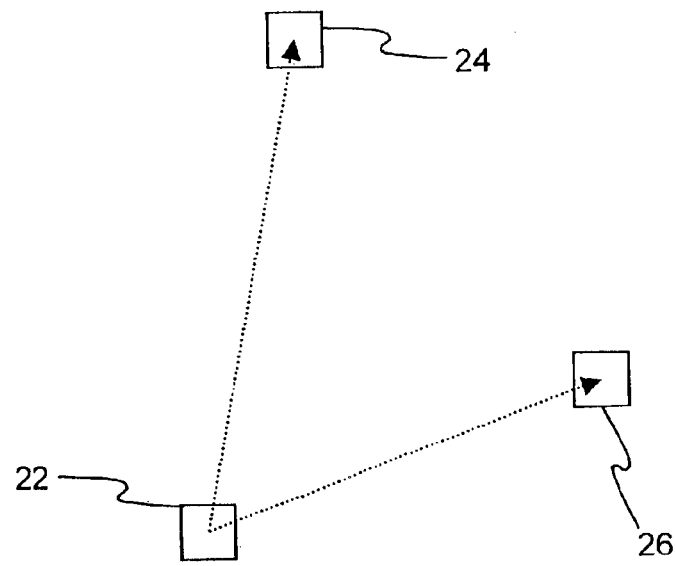
Figure 18

BEACON DOCKING SYSTEM WITH VISUAL GUIDANCE DISPLAY

This application is a continuation-in-part of U.S. patent application Ser. No. 10/139,376 filed May 07, 2002. now U.S. Pat. No. 6,637,063.

FIELD OF THE INVENTION

The instant invention relates generally to visual docking guidance systems, and particularly to a beacon docking system with visual guidance display.

BACKGROUND OF THE INVENTION

In order to make aircraft passengers comfortable, and in order to transport them between an airport terminal and an aircraft in such a way that they are protected from the weather and other environmental influences, passenger loading bridges are used which can be telescopically extended and the height of which is adjustable. For instance, an apron drive bridge in present day use comprises a plurality of adjustable modules, including a rotunda, a telescopic tunnel, a bubble section, a cab, and elevating columns with wheel carriage. Of course, other types of bridges are known in the art, such as for example nose loaders, radial bridges, pedestal bridges, dual bridges and over the wing bridges. Additionally, multiple doorways along a same side or opposite sides of the aircraft may be serviced at a same time, for example using the over the wing bridge or two separate bridges.

Manual, semi-automated and automated bridge alignment systems are known for adjusting the position of a passenger loading bridge relative to a doorway of an aircraft, for instance to compensate for different sized aircraft and to compensate for imprecise parking of the aircraft at an airport terminal, etc.

Often, manual bridge alignment systems are preferred by the airlines because a trained bridge-operator is present and is able to observe directly the movements of the bridge relative to the doorway of the aircraft. Typically, the bridge-operator uses a control panel located within the cab section to adjust the bridge each time a flight arrives. Accordingly, the probability that the bridge will collide with an aircraft during an alignment operation is relatively small.

Of secondary concern to the airlines is ensuring that the passenger loading bridge is aligned with the doorway of the aircraft as rapidly as possible, thereby minimizing the time that is required to complete passenger deplaning, cleaning, restocking etc. As such, semi-automated bridge alignment systems are known in the prior art, which systems allow the bridge to be moved rapidly to a preset position under the control of a programmable controller or embedded control system. For example, some passenger loading bridges are equipped with controls that automatically cause the height adjustment mechanism to move the cab to a predetermined height. Unfortunately, the bridge-operator must be present to press a switch for enabling the automated height adjustment. As such, the bridge-operator must arrive at the passenger loading bridge in advance of the aircraft, which wastes the time of the bridge-operator, or alternatively the bridge-operator initiates the height adjustment after the aircraft has arrived at the passenger loading bridge, which inconveniences the passengers that are waiting on board the aircraft.

Schoenberger et al. in U.S. Pat. No. 5,226,204 discloses a semi-automated passenger loading bridge that uses video cameras in the control of the passenger loading bridge. The system maneuvers a movable end of the bridge to a position close to the doorway of the aircraft, whereupon an operator controls the bridge during the last part of its movement by looking at images recorded by the video cameras. Suggestions are made in the patent specification that the system could be arranged to operate in a fully automated manner using image-processing of the recorded images to calculate the distance between the passenger loading bridge and the aircraft. However, image-processing is time-consuming, thus making the movement based thereon slow.

WO 96/08411, filed Sep. 14, 1995 in the name of Anderberg, discloses another device for controlling the movement of a passenger loading bridge. When an aircraft has landed, a central computer, such as for instance a central computer located within a terminal building, transmits information on the type or model of aircraft to a local computer of the passenger loading bridge at an assigned gate. The local computer accesses a local database and retrieves information on the positions of the doors for the type of aircraft that has landed, as well as information on the expected stop position for the type of aircraft at the assigned gate. The retrieved information allows the local computer to determine an absolute position of the door with which the passenger loading bridge is to be aligned. The system also includes sensors for providing real-time positional data for a cab end of the bridge to the local computer. Accordingly, the passenger loading bridge is moved under computer control to a position close to the determined position of the door, for example within 2–10 meters. Optionally, the bridge is preset to this position before the aircraft has stopped moving.

WO 01/34467, filed Nov. 8, 2000 also in the name of Anderberg, teaches that the above system is reliable only for movement to a position close to the aircraft. Thus, the bridge has to be operated manually during the remaining 2–10 meters of its movement. The WO 01/34467 reference also teaches an improvement to the above system, in which electromagnetic sensors are disposed along the distal end of the passenger loading bridge for transmitting a set of electromagnetic pulses in different directions and for detecting electromagnetic pulses after reflection from an aircraft. Based upon the elapsed time between transmitting and detecting the electromagnetic pulses in different directions, a profile of distance as a function of direction is obtained. From the measured distance versus direction profile and the information stored in the computer, it is then possible to maneuver the bridge to the doorway of the aircraft. Unfortunately, the local computer must be in communication with a flight information database of the airport terminal building in order to receive information relating to the type or model of aircraft that is approaching the gate. Such a database must be set up to be accessible by the local computer, and there may be serious security-related issues involved with providing widely distributed access to sensitive flight information. Furthermore, many airports around the world do not support databases that would be suitable for interfacing with a passenger loading bridge system as described by Anderberg. In those cases, the authorities considering an automated passenger bridge would demand a system capable of completely autonomous operation.

Additionally, there are prior art systems for guiding the aircraft to the correct location for docking with a passenger boarding bridge. Fabriksmonteringin Trelleborg AB describe a current state of the art system (http://www.fmt.se). The aircraft parking and information system APIS++ is a laser-based visual docking guidance system used to visually guide a pilot to intercept and establish an aircraft on a gate centerline, and to proceed to a stopping position at an aircraft gate. Real-time azimuth guidance is provided to the pilot by means of a unique Moiré technology azimuth guidance unit. Aircraft type and series information is displayed on an alphanumeric display panel, confirming to the pilot to proceed with the docking maneuver. Aircraft closing rate and stopping position information is provided by a closing rate indicator, which starts a distance-to-go countdown when the aircraft is within close range from its correct stopping position. When interfaced to flight information display systems (FIDS), airports operations database control (AODC) or to air traffic control center (ATCC), APIS++ receives notification that an aircraft has landed. Further provided to the APIS++ is an automatic selection of aircraft type. Advantageously, APIS++ communicates and cooperates with passenger boarding bridges during the process of docking the aircraft. A similar system is described in detail in U.S. Pat. No. 6,324,489, by Millgard, filed Oct. 29, 1999. This system, like the APIS++, provides visual cues to the pilot of an aircraft to assist the pilot in correctly positioning the aircraft relative to the terminal building. The system according to Millgard also makes use of a laser mounted to a stationary fixture to identify and determine the position of the aircraft.

It is a disadvantage of the prior art manual, semi-automated and automated bridge alignment systems that the alignment operation is performed on the basis of observations that are made from a location that is remote to the aircraft. If such observations are erroneous, then the bridge may be allowed to collide unintentionally with the aircraft. Examples of observations that are prone to error include: visually or electronically determining a type of the aircraft; keying in a type of the aircraft into a flight information database; judging the distance remaining between the bridge and the aircraft, etc. Of course, adverse environmental conditions, such as snow, fog, darkness, etc., will greatly increase the likelihood of an erroneous observation.

It would be advantageous to provide a system that simplifies the approach of the aircraft and the docking of the passenger boarding bridge beyond the advances described with reference to the prior art. Further, it would be beneficial to provide members of the flight crew aboard the aircraft some control over the passenger boarding bridge.

SUMMARY OF THE INVENTION

The invention describes a method of remotely controlling a passenger boarding bridge from an aircraft having a doorway, comprising the steps of:

transmitting a first electromagnetic signal forming a beacon and a second electromagnetic signal for providing control signal information using at least a transmitter disposed proximate the doorway of the aircraft;

receiving the beacon and the second electromagnetic signal using at least a receiver disposed at a location remote from the first transmitter; and, displacing an aircraft docking end of the passenger boarding bridge in dependence upon the received beacon and the control signal information.

The invention also teaches a passenger boarding bridge system comprising:

a cab section for docking to a doorway of an aircraft;

a receiver for receiving a wireless signal from a transmitter, the wireless signal, including a control signal and an identifier signal; the receiver for determining a distance and a position of the transmitter relative to the receiver in dependence upon the signal provided by the transmitter and, a controller for providing a control signal for controlling movement of the cab section of the passenger boarding bridge in dependence upon the instruction signal and the identifier signal.

Further, the invention describes a system for automatically aligning one end of a passenger boarding bridge to an aircraft having a doorway, comprising:

a receiver disposed aboard the passenger boarding bridge for receiving an electromagnetic signal transmitted from a transmitter disposed aboard the aircraft and for providing an electrical output signal relating to the electromagnetic signal;

a bridge controller in operative communication with the receiver, for receiving the electrical output signal provided from the receiver, for determining a next movement of the one end of the passenger boarding bridge in a direction toward the doorway of the aircraft based upon the electrical output signal, and for providing a control signal relating to the determined next movement; and a drive mechanism in communication with the bridge controller, for receiving the control signal provided from the bridge controller, and for driving the one end of the passenger boarding bridge in the determined direction toward the doorway of the aircraft.

Additionally, the invention teaches a system for automatically aligning one end of a passenger boarding bridge to an aircraft having a doorway, comprising:

a transceiver for receiving the electromagnetic signal transmitted from a transmitter disposed aboard the aircraft, the transceiver for providing a second electromagnetic signal relating to the received electromagnetic signal;

a processor in electrical communication with the transceiver, for determining a next movement of at least one of the aircraft and the one end of the passenger boarding bridge for relatively moving the one end of the passenger boarding bridge in a direction toward the doorway of the aircraft, for producing an electrical output signal indicative of the determined next movement and relating to the second electromagnetic signal, and for providing the electrical output signal to the transceiver; and a receiver disposed aboard the passenger boarding bridge for receiving at least one of the electromagnetic signal and the second electromagnetic signal and for producing a second electrical output signal relating to the at least one of the electromagnetic signal and the second electromagnetic signal.

BRIEF DESCRIPTION OF THE DRAWINGS

Exemplary embodiments of the invention will now be described in conjunction with the following drawings, in which similar reference numbers designate similar items:

FIG. 17a is a simplified diagram showing a second method of aligning a passenger boarding bridge to an aircraft doorway, prior to alignment;

FIG. 17b is a simplified diagram showing a second method of aligning a passenger boarding bridge to an aircraft doorway, in which the passenger boarding bridge and the aircraft doorway are aligned;

FIG. 18 is a simplified diagram showing a first triangulation method for aligning a passenger boarding bridge to an aircraft doorway;

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein. Throughout the disclosure and in the claims that follow, it is to be understood that an optical signal includes any signal that is transmitted using one of infrared, visible and ultraviolet radiation.

Figure 1:
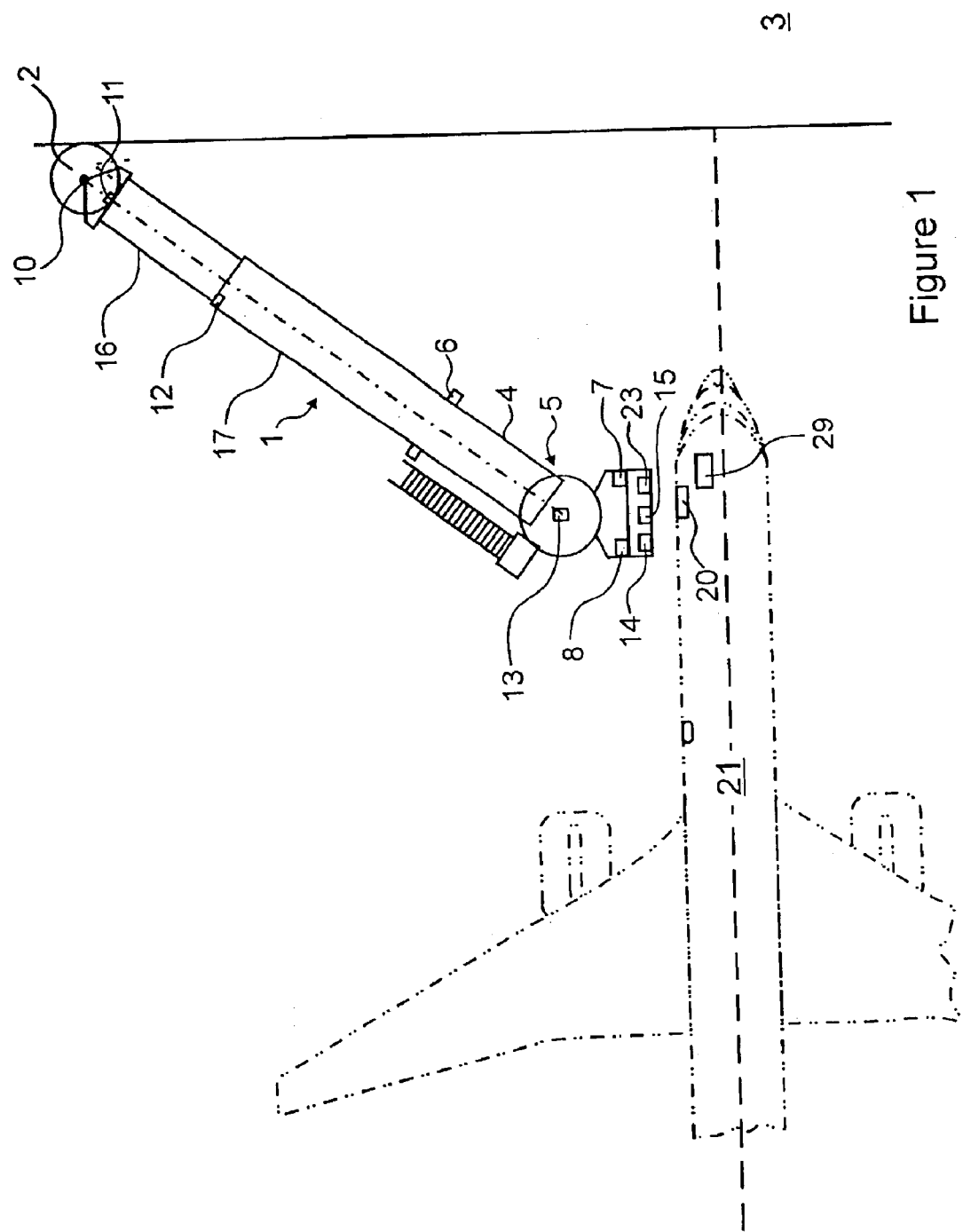
FIG. 1 is a top plan view of a passenger boarding bridge and an aircraft equipped with an automated docking system according to a first embodiment of the instant invention.

Referring to FIG. 1, shown is a system according to a first embodiment of the instant invention. An aircraft 21 having a doorway 20 is equipped with a transmitter unit 29 for transmitting one of an optical signal and a radio frequency (rf) signal. Preferably, the transmitter unit 29 is disposed within a window (not shown) of the doorway 20 to which a passenger boarding bridge 1 is to be connected.

Also illustrated in FIG. 1 is the passenger boarding bridge 1, for instance an apron drive bridge including a rotunda 2 that is connected to a terminal building 3 and from which extends a passageway 4. The passageway 4 ends with a pivotable cabin 5 and includes inner passageway element 16 and outer passageway element 17, wherein the inner passageway element 16 is telescopically received within the outer passageway element 17 such that the length of the passageway 4 is variable. Each passageway element 16,17 includes a left sidewall, a right sidewall, a floor member and a ceiling member. Optionally, a number of passageway elements other than two is provided.

The passageway 4 is supported by a frame 6 for adjusting the height of the passenger boarding bridge 1. Preferably, the frame 6 includes a bogie (not shown) with driving wheels (not shown) for achieving angular displacement of the passenger boarding bridge 1 as well as telescoping of the passageway elements 16 and 17 to alter the length of the passageway 4. Finally, the passenger boarding bridge 1 includes additional mechanisms (not shown) for pivoting the cabin 5 and for leveling a not illustrated floor surface thereof.

Advantageously, the modular design of the passenger boarding bridge 1 allows the bridge to be guided to different positions in order to service a wide range of aircraft models, and/or a wide range of aircraft doorway positions on either the right or left side of the aircraft 21. To this end a bridge controller 7 is provided in communication with the various mechanisms, for providing control signals for automatically adjusting the position of the passenger boarding bridge 1, so as to permit a cabin end of the passenger boarding bridge 1 to be aligned with the doorway 20 of the aircraft 21 in an automated manner. A control panel 8 is disposed within the cabin 5 to be used by a bridge-operator when manual operation is required. Optionally, the control panel 8 is located on the opposite side of the cabin.

The passenger boarding bridge 1 is equipped with first, second and third transducers 10, 11 and 12 for determining the angular position of the passageway, the height of the passageway and the relative positions of the passageway elements, respectively. The bridge 1 is further equipped with a fourth transducer 13 for sensing the angular position of the cabin 5. Optionally, the second transducer 11 is disposed proximate the frame 6 for determining the height of the passageway. The transducers are in communication with the bridge controller 7 and provide control signals thereto, for use by the bridge controller 7 in determining a next movement of the passenger boarding bridge 1 toward the doorway 20 of the aircraft 21. Of course, other types of transducers and/or other numbers of transducers and/or other locations of transducers are optionally used to determine the position of the bridge. For instance, a laser may be mounted on the roof of the cabin 5, as may at least two reflectors on different locations on the terminal building. By sweeping the laser, measuring the distance to the reflectors with the aid of the laser, and determining the angular position of the laser when directed toward the reflectors, the position of the cabin 5 is determinable.

Preferably, the passenger boarding bridge 1 further includes a range measuring device 14, for instance an electromagnetic distance meter, for sensing a close approach of the passenger boarding bridge to the aircraft 21. An electromagnetic signal used for determining the distance to the aircraft by the distance meter is optionally an optical signal with a fixed wavelength range within the infrared spectrum. Alternatively, the range measuring device is acoustic. Further optionally, the range measuring device 14 provides a signal to the bridge controller 7 for automatically reducing the rate of approach of the passenger boarding bridge 1 to the aircraft 21 within a predetermined distance. Further optionally, one or more pressure sensors 15 are provided along a bumper at the cabin end of the passenger boarding bridge 1 for sensing engagement with the aircraft 21. Of course, the range measuring device 14 and the one or more pressure sensors 15 are effective only at very close approach to the aircraft 21.

Referring still to FIG. 1, the passenger boarding bridge 1 includes at least a receiver unit 23 fixedly mounted near the cabin end of the passenger boarding bridge 1, for receiving the one of an optical signal and a radio frequency (rf) signal emitted by transmitter unit 29 of the aircraft 21. Optionally, a second receiver (not shown) is disposed along one of the outside lateral surfaces of the passenger boarding bridge 1 for receiving the one of an optical signal and a radio frequency (rf) signal emitted by transmitter unit 29 of the aircraft 21 when the passenger boarding bridge is in a stowed position. The signal is emitted by the transmitter unit 29 of the aircraft 21 to "call" for the passenger boarding bridge 1 when the aircraft 21 is parked at the gate area adjacent the passenger boarding bridge 1. Preferably, the signal is also used to guide the cabin end of the passenger boarding bridge 1 into engagement with the doorway 20 of the aircraft 21. When the signal is in the form of an optical signal, for instance an infrared signal, an optional shroud (not shown) is provided to shield the emitters and detectors and to provide beam-angle restriction. This is to ensure precise alignment and zone detection for docking and also to minimize interference from other light sources. Suitable shrouds having a plastic or metal housing are known in the art.

Figure 2A:
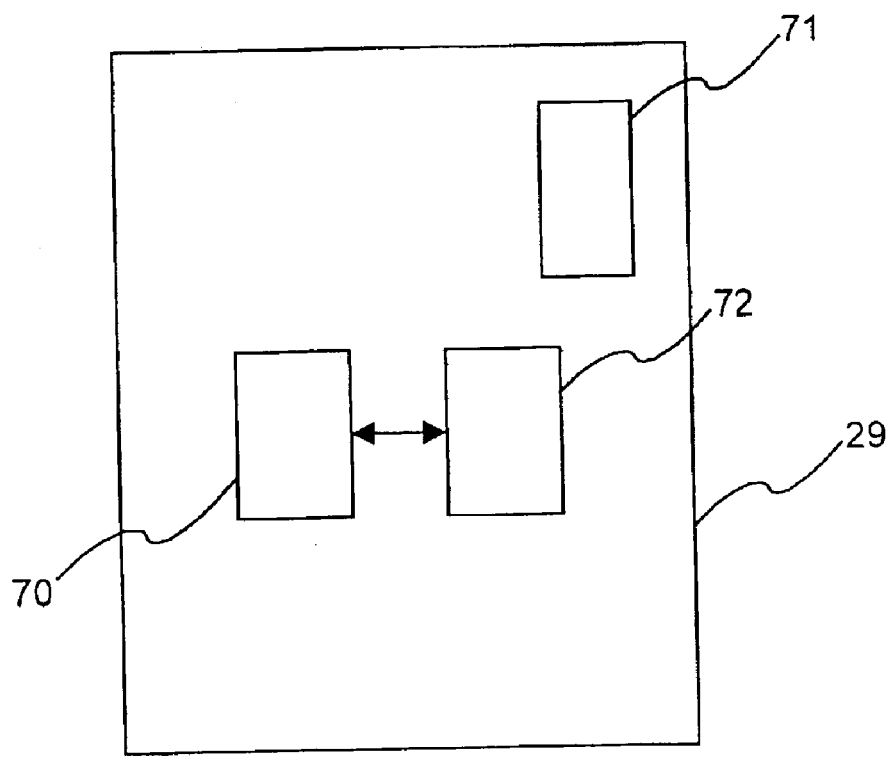
FIG. 2a is a schematic block diagram of a transmitter unit for use with the system illustrated in FIG. 1.

Referring now to FIG. 2a, a transmitter unit 29 for use with a first embodiment of the instant invention is shown in greater detail. The transmitter unit 29 includes a wireless transmitter 70, for instance one of an optical transmitter and a radio frequency (rf) transmitter, and an onboard power source 71, such as for instance a rechargeable battery pack. The transmitter unit 29 includes a signal generator 72 in communication with the wireless transmitter 70, for generating the signal to be transmitted by the wireless transmitter 70.

Figure 2B:
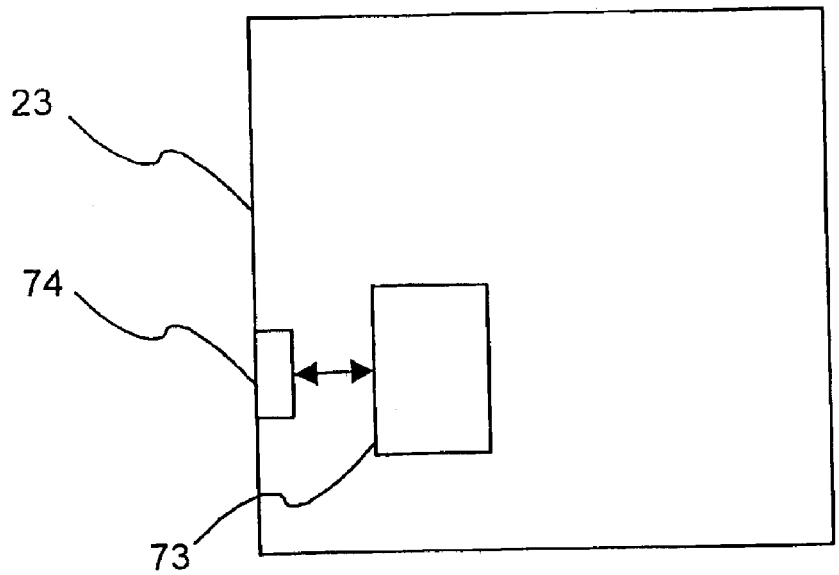
FIG. 2b is a schematic block diagram of a receiver unit for use with the system illustrated in FIG. 1.

Referring now to FIG. 2b, a receiver unit 23 for use with the first embodiment of the instant invention is shown in greater detail. Elements labeled with the same numerals have the same function as those illustrated in FIG. 2a. The receiver unit 23 includes a wireless receiver 73 for receiving the signal transmitted by the transmitter unit 29. The wireless receiver 73 is in communication with a data input/output port 74 for providing the received signal to the bridge controller 7 of the passenger boarding bridge 1.

Referring again to FIG. 1, the illustrated system is for use with passive methods of alignment in which one-way communication occurs between the aircraft 21 and the passenger boarding bridge 1. In a first mode of operation of the system shown in FIG. 1, every type of aircraft emits a generic signal, which is a same signal for every type of aircraft. In use, the transmitter unit 29 emits the generic signal, which is received by the receiver unit 23. The receiver unit 23 provides the generic signal to the bridge controller 7. The bridge controller 7 uses the generic signal to align the cabin end of the passenger boarding bridge 1 with the doorway 20 of the aircraft 21. For example, the bridge controller actuates mechanisms of the passenger boarding bridge, so as to move the cabin end of the passenger boarding bridge into a position in which the receiver unit 23 is precisely aligned with the transmitter unit 29. To this end, the transmitter unit 29 is preferably positioned at a same predetermined location relative to the outline of the doorway 20 for every type of aircraft 21, such that the passenger boarding bridge 1 is reliably aligned to the doorway whenever the transmitter unit 29 and the receiver unit 23 are precisely aligned. Suitable methods for aligning the receiver unit 23 with the transmitter unit 29 are discussed in greater detail, below.

In a second mode of operation of the system shown in FIG. 1, each different class of aircraft is assigned a class-specific signal, for instance the signal for a 737-700 is different from the signal for a 737-800 which is different from the signal for a 747-400 and so on. To this end, the transmitter unit 29 is configured to transmit the class-specific signal corresponding to the type of the aircraft 21. In use, the transmitter unit 29 emits the class-specific signal, which is received by the receiver unit 23. The class-specific signal is provided to the bridge controller 7 and analyzed to determine information pertaining to certain attributes of the aircraft, such as for instance doorway height, front and rear doorway separation, expected stopping position of the type of aircraft, etc. Optionally, the bridge controller 7 uses the class-specific information to preset the passenger boarding bridge 1 to a predetermined position, in advance of the aircraft 21 coming to a complete stop.

It is an advantage of the present embodiment of the instant invention that an authorized user may reconfigure the transmitter unit 29, so as to change the class specific signal that is emitted, in order to accommodate a different class of aircraft. Accordingly, one type of transmitter unit 29 can be manufactured and subsequently configured by an authorized user to represent a desired class of aircraft. Furthermore, if an aircraft type is retired or otherwise changed, then the transmitter unit 29 can be salvaged and reconfigured for use with a different type of aircraft. Preferably, the reconfiguration of the transmitter unit 29 requires correct authorization, in order to ensure safe operation of the system. Further advantageously, the transmitter unit 29 supports use with a large plurality of types of aircraft. For example, using a simple 8 bit-encoding scheme, it is possible to represent 256 different types of aircraft.

Figure 3:
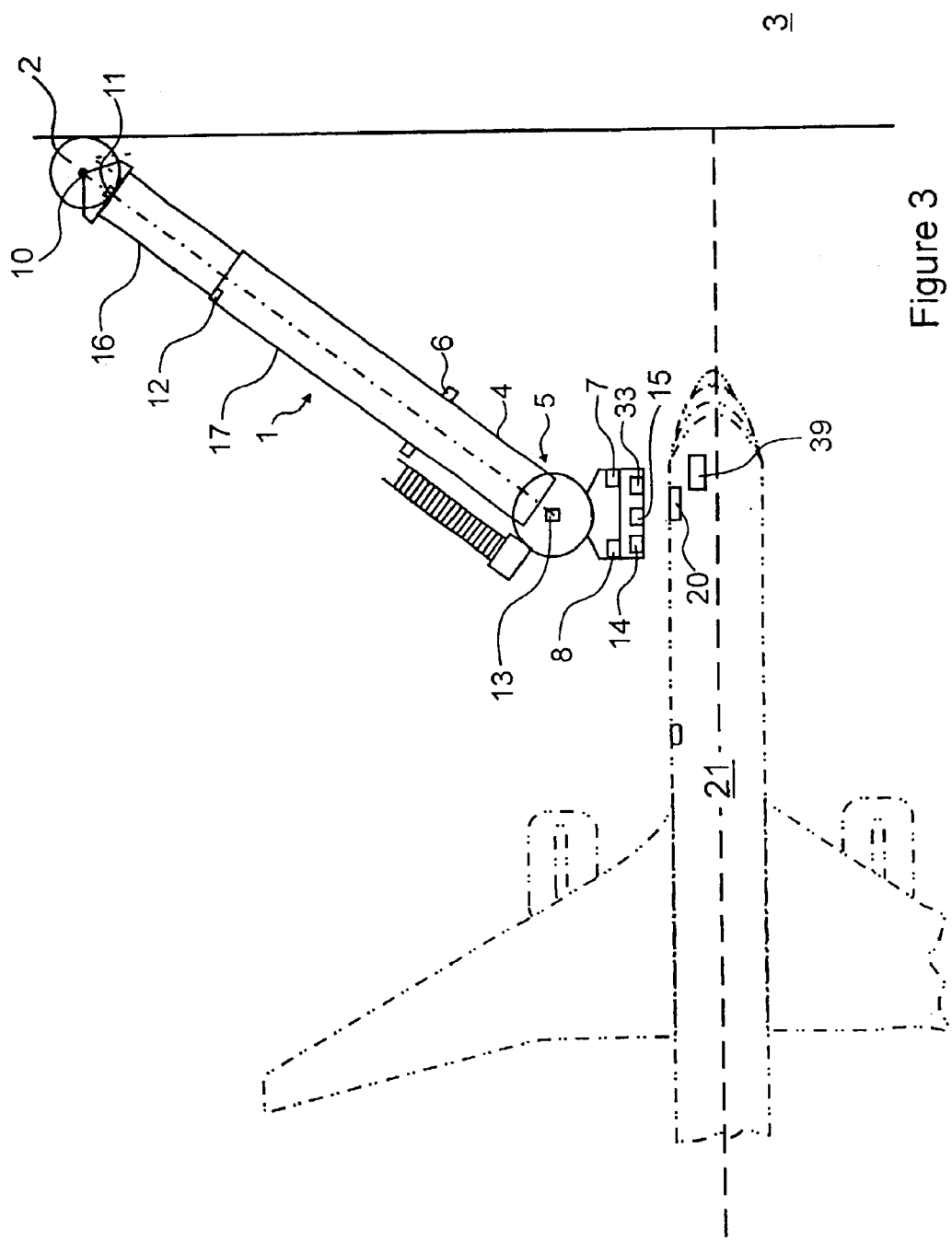
FIG. 3 is a top plan view of a passenger boarding bridge and an aircraft equipped with an automated docking system according to a second embodiment of the instant invention.

Referring to FIG. 3, shown is a system according to a second embodiment of the instant invention. Elements labeled with the same numerals have the same function as those illustrated in FIG. 1. An aircraft 21 having a doorway 20 is equipped with a transmitter unit 39 for transmitting one of an optical signal and a radio frequency (rf) signal. Preferably, the transmitter unit 39 is disposed within a window (not shown) of the doorway 20 to which a passenger boarding bridge 1 is to be connected. The passenger boarding bridge 1 includes a receiver unit 33 fixedly mounted near the cabin end of the passenger boarding bridge 1, for receiving the one of an optical signal and a radio frequency (rf) signal emitted by transmitter unit 39 of the aircraft 21. The signal is emitted by the transmitter unit 39 of the aircraft 21 to "call" for the passenger boarding bridge 1 when the aircraft 21 is parked at the gate area adjacent the passenger boarding bridge 1. Preferably, the signal is also used to guide the cabin end of the passenger boarding bridge 1 into engagement with the doorway 20 of the aircraft 21. When the signal is in the form of an optical signal, for instance an infrared signal, an optional shroud (not shown) is provided to shield the emitters and detectors and to provide beam-angle restriction. This is to ensure precise alignment and zone detection for docking and also to minimize interference from other light sources. Suitable shrouds having a plastic or metal housing are known in the art. A signal provided by the transmitter unit indicates the position of the transmitter unit relative to the doorway. In this way, the transmitter unit need not be provided in a window of a doorway of the aircraft. Clearly, if it is desirable to support a wide range of mounting locations for the transmitter unit 39, then the receiver unit 33 should support all of these mounting locations. In order to support a wide range of transmitter unit 39 locations the receiver unit 33 is optionally an array of receiver units, each for supporting the reception of signals provided by a transmitter unit 39 disposed within a predetermined portion of the supported transmitter unit mounting locations. For example, if the transmitter unit 39 is positioned in a window of a doorway of the aircraft then a first receiver of the passenger boarding bridge is used to receive the signal. If the transmitter unit 39 is instead positioned in a window of the cockpit of the aircraft then a second receiver unit is used. Similarly, if the transmitter unit 39 is positioned at the top of the fuselage of the aircraft then a third receiver is used. Clearly, the nature of the signal being transmitted from the transmitter unit 39 and the desired alignment accuracy will determine the appropriate number and position of the receivers.

Figure 4A:
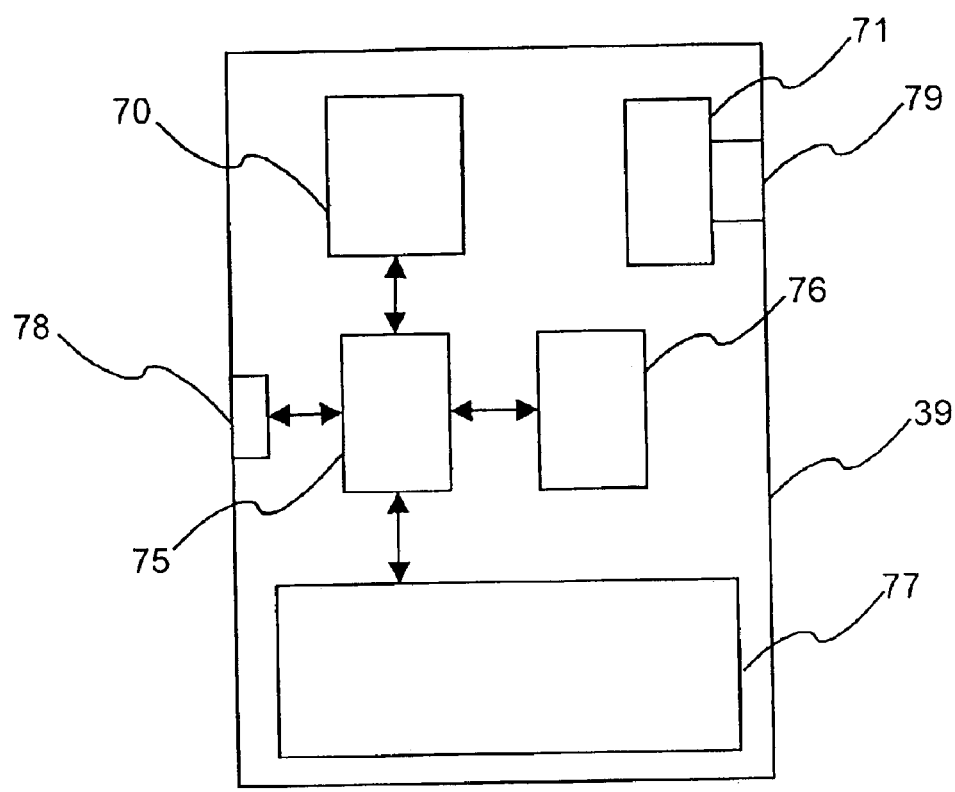
FIG. 4a is a schematic block diagram of a transmitter unit for use with the system illustrated in FIG. 3.

Referring now to FIG. 4a, shown is a transmitter unit 39 for use with the second embodiment of the instant invention. Elements labeled with the same numerals have the same function as those illustrated in FIG. 2a. The transmitter unit 39 includes a wireless transmitter 70, for instance one of an optical transmitter and a radio frequency (rf) transmitter, in communication with a processor 75. The processor 75 is further in communication with each one of a memory circuit 76, a data entry device 77 and a data input/output port 78. The transmitter unit 39 includes an onboard power source 71 such as for instance a rechargeable battery pack coupled to an onboard power system of the aircraft 21 via a power coupling 79. The data entry device 77 is for use by a flight-crew member for providing ancillary information to be transmitted by the transmitter unit 39. The processor also stores within the memory circuit 76 any data that is provided from the aircraft central computer system (not shown) via data input/output port 78. During use, the processor generates a signal including data retrieved from the memory circuit 76, and provides the signal to the wireless transmitter 70 for transmission thereby.

Figure 4B:
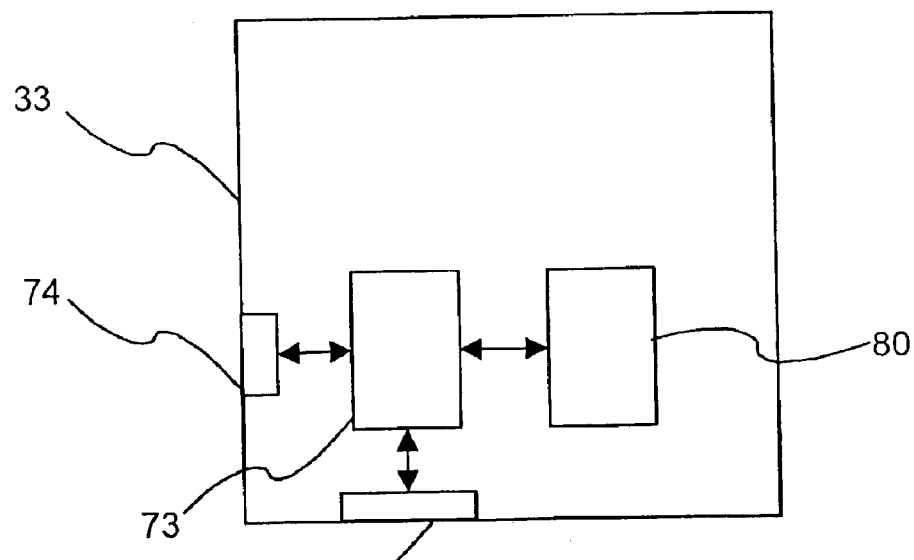
FIG. 4b is a schematic block diagram of a receiver unit for use with the system illustrated in FIG. 3.

Referring now to FIG. 4b, shown is a receiver unit 33 for use with the second embodiment of the instant invention. Elements labeled with the same numerals have the same function as those illustrated in FIG. 2b. The receiver unit 33 includes a wireless receiver 73 for receiving the signal transmitted by the transmitting unit 39. The wireless receiver 73 is also in communication with each one of a memory circuit 80 for retrievably storing information relating to the bridge alignment process, and a data input/output port 74 for transferring the received signal to the bridge controller 7 of the passenger boarding bridge 1.

Referring again to FIG. 3, the illustrated system is for use with passive methods of alignment in which one-way communication occurs between the aircraft 21 and the passenger boarding bridge 1. In a first mode of operation of the system shown in FIG. 3, every type of aircraft uses a generic signal, which is a same signal for every type of aircraft. In use, the transmitter unit 39 emits the generic signal, which is received by the receiver unit 33. The receiver unit 33 provides the generic signal to the bridge controller 7 via the data input/output port 74. The bridge controller 7 uses the generic signal to align the cabin end of the passenger boarding bridge 1 with the doorway 20 of the aircraft 21. For example, the bridge controller actuates mechanisms of the passenger boarding bridge, so as to move the cabin end of the passenger boarding bridge into a position in which the receiver unit 33 is precisely aligned with the transmitter unit 39. To this end, the transmitter unit 39 is preferably positioned at a same predetermined location relative to the outline of the doorway 20 for every type of aircraft 21, such that the passenger boarding bridge 1 is reliably aligned to the doorway whenever the transmitter unit 39 and the receiver unit 33 are precisely aligned. Suitable methods for aligning the receiver unit 33 with the transmitter unit 39 are discussed in greater detail, below.

In a second mode of operation of the system shown in FIG. 3, every class of aircraft is assigned a class-specific signal, for instance the signal for a 737-700 is different from the signal for a 737-800 which is different from the signal for a 747-400 and so on. In use, the transmitter unit 39 emits the class-specific signal, which is received by the receiver unit 33. The class-specific signal is provided to the bridge controller 7 via the data input/output port 74, and is analyzed to determine information pertaining to certain attributes of the aircraft, such as for instance doorway height, front and rear doorway separation etc. Optionally, the bridge controller 7 uses the class-specific information to pre-set the passenger boarding bridge 1 to a predetermined position, in advance of the aircraft 21 coming to a complete stop.

Further optionally, the signal transmitted by the wireless transmitter 70 includes ancillary data provided by a flight-crew member using the data entry device 77 of the transmitter unit 39. For example, the flight-crew member provides the number of passengers on board the aircraft 21 using the data entry device 77, and the processor 75 stores the ancillary information within the memory circuit 76. When the aircraft 21 approaches the passenger boarding bridge, the transmitter unit 39 provides the ancillary information to the bridge controller 7 via the receiver unit 33. The bridge controller 7 then uses the ancillary information to determine whether or not the use of a second bridge, for example an over the wing passenger boarding bridge, when available, is desired.

Figure 5:
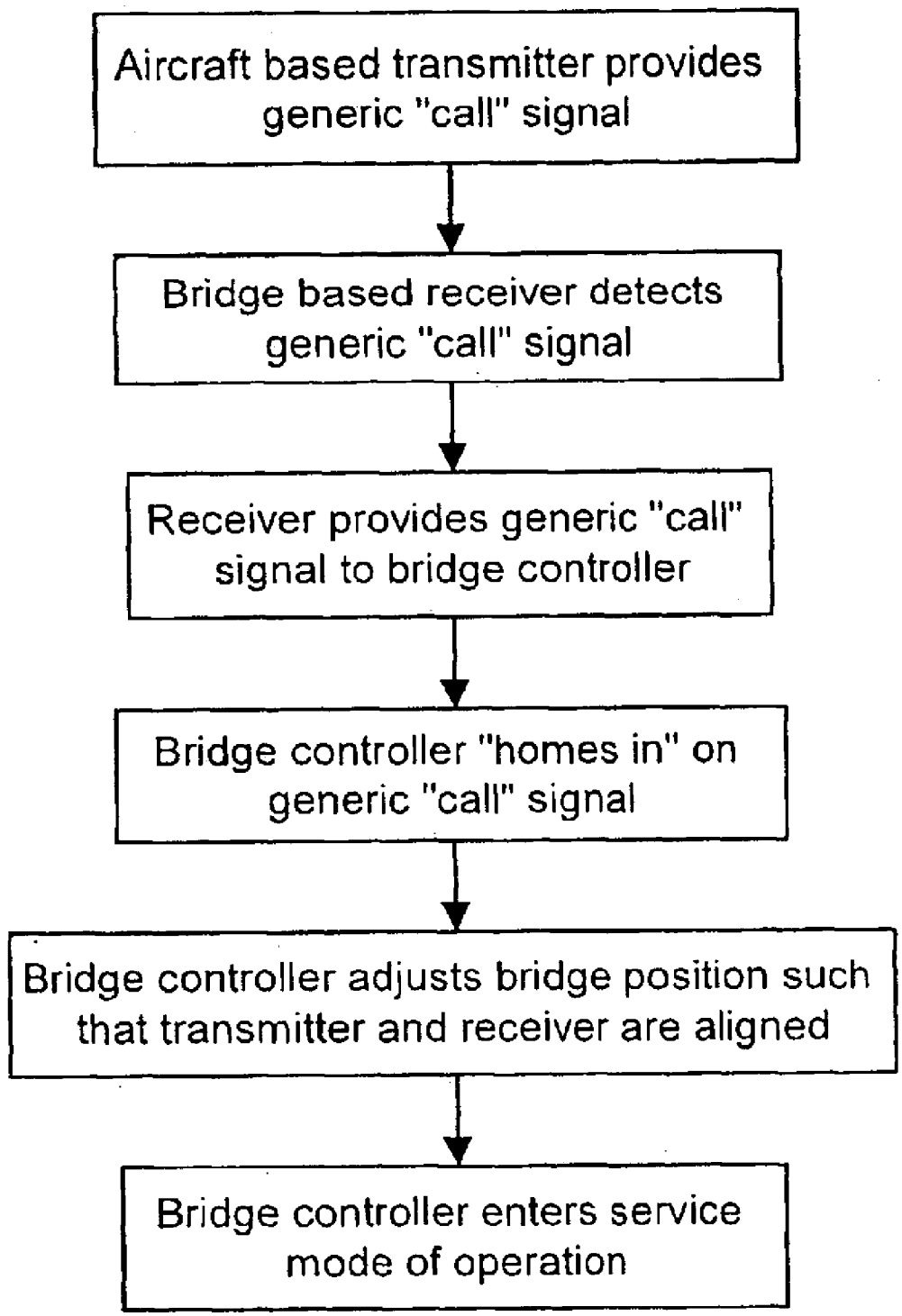
FIG. 5 is a simplified flow diagram of a method of aligning a passenger boarding bridge to a doorway of an aircraft using the system described with reference to FIG. 1.

Referring now to FIG. 5, shown is a method of aligning the passenger boarding bridge 1 with the doorway 20 of the aircraft 21 using the system of FIG. 3. The transmitter unit 39 transmits a generic "call" signal to the receiver unit 33. The receiver unit 33 provides the generic "call" signal to the bridge controller 7. In dependence upon receiving the generic "call" signal, the bridge controller 7 "wakes up" from a standby mode and enters an alignment mode of operation. The bridge controller 7 adjusts the vertical and horizontal position of the passenger boarding bridge such that the receiver unit 33 becomes precisely aligned with or "homes in on" the transmitter unit 39. Preferably, the bridge controller 7 enters a service mode of operation once the alignment operation is complete. The service mode of operation includes functions such as auto-leveling the passenger boarding bridge 1 during the enplaning and/or deplaning operations, etc.

Optionally, the bridge controller 7 receives other signals from the range measuring device 14 and the one or more pressure sensors 15, such that the rate of approach of the passenger boarding bridge 1 to the aircraft 21 is optionally automatically reduced as the distance to the aircraft 21 decreases.

Figure 6:
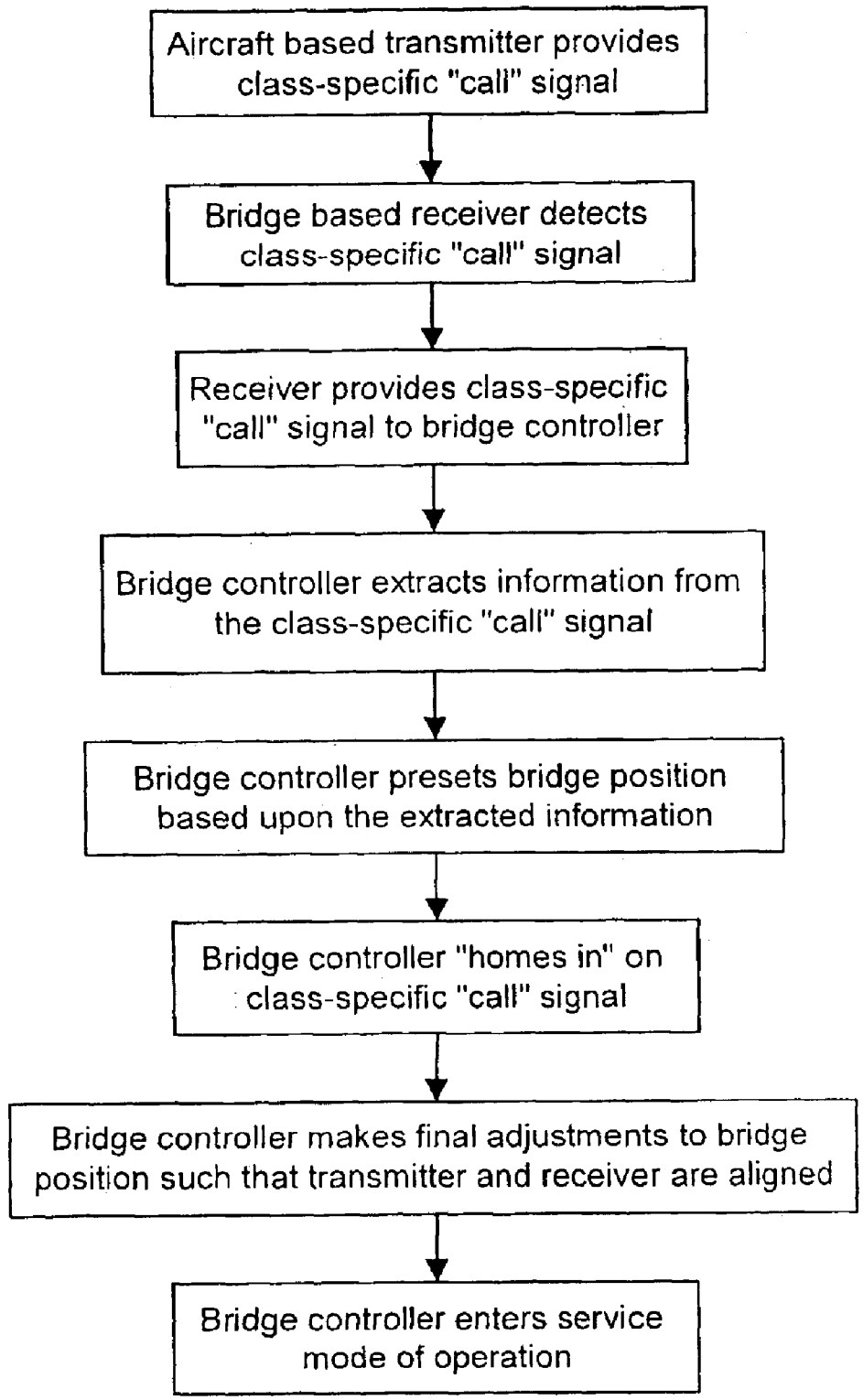
FIG. 6 is a simplified flow diagram of another method of aligning a passenger boarding bridge to a doorway of an aircraft using the system described with reference to FIG. 1.

Referring now to FIG. 6, shown is another method of aligning the passenger boarding bridge 1 with the doorway 20 of the aircraft 21 using the system of FIG. 3. The transmitter unit 39 transmits a class-specific "call" signal to the receiver unit 33, wherein the class-specific "call" signal includes information relating to certain attributes of the aircraft, such as for instance doorway height, front and rear doorway separation, expected stopping position etc. The receiver unit 33 provides the class-specific "call" signal to the bridge controller 7. In dependence upon receiving the class-specific "call" signal, the bridge controller 7 "wakes up" from a standby mode and enters an alignment mode of operation. The bridge controller 7 analyzes the class-specific "call" signal to extract the information pertaining to certain attributes of the aircraft. Based on the extracted information, the bridge controller 7 optionally pre-sets the passenger boarding bridge to a position close to the expected stopping position of the doorway 21 of the aircraft 20. The final adjustments to align the passenger boarding bridge 1 to the doorway 21 of the aircraft 20 are performed by "homing in on" the class-specific "call" signal being transmitted by the transmitter unit 39. The passenger boarding bridge 1 is aligned when the vertical and horizontal position of the passenger boarding bridge is such that the receiver unit 33 is precisely aligned with the transmitter unit 39. Preferably, the bridge controller 7 enters a service mode of operation once the alignment operation is complete. The service mode of operation includes functions such as auto-leveling the passenger boarding bridge 1 during the enplaning and/or deplaning operations, etc.

Optionally, the bridge controller 7 receives other signals from the range measuring device 14 and the one or more pressure sensors 15, such that the rate of approach of the passenger boarding bridge 1 to the aircraft 21 is optionally automatically reduced as the distance to the aircraft 21 decreases.

Of course, the methods described with reference to FIGS. 5 and 6 are also applicable to the system described with reference to. FIG. 1.

It is an advantage of the second embodiment of the instant invention that an authorized user may reconfigure the transmitter unit 39, so as to change the class specific signal that is emitted, in order to accommodate a different class of aircraft. Accordingly, one type of transmitter unit 39 can be manufactured and subsequently configured by an authorized user to represent a desired class of aircraft. Furthermore, if an aircraft type is retired or otherwise changed, then the transmitter unit 39 can be salvaged and reconfigured for use with a different type of aircraft. Of course, the reconfiguration of the transmitter unit 39 requires correct authorization, in order to ensure safe operation of the system. Further advantageously, the transmitter unit 39 supports use with a large plurality of types of aircraft. For example, using a simple 8 bit-encoding scheme, it is possible to represent 256 different types of aircraft.

Figure 7:
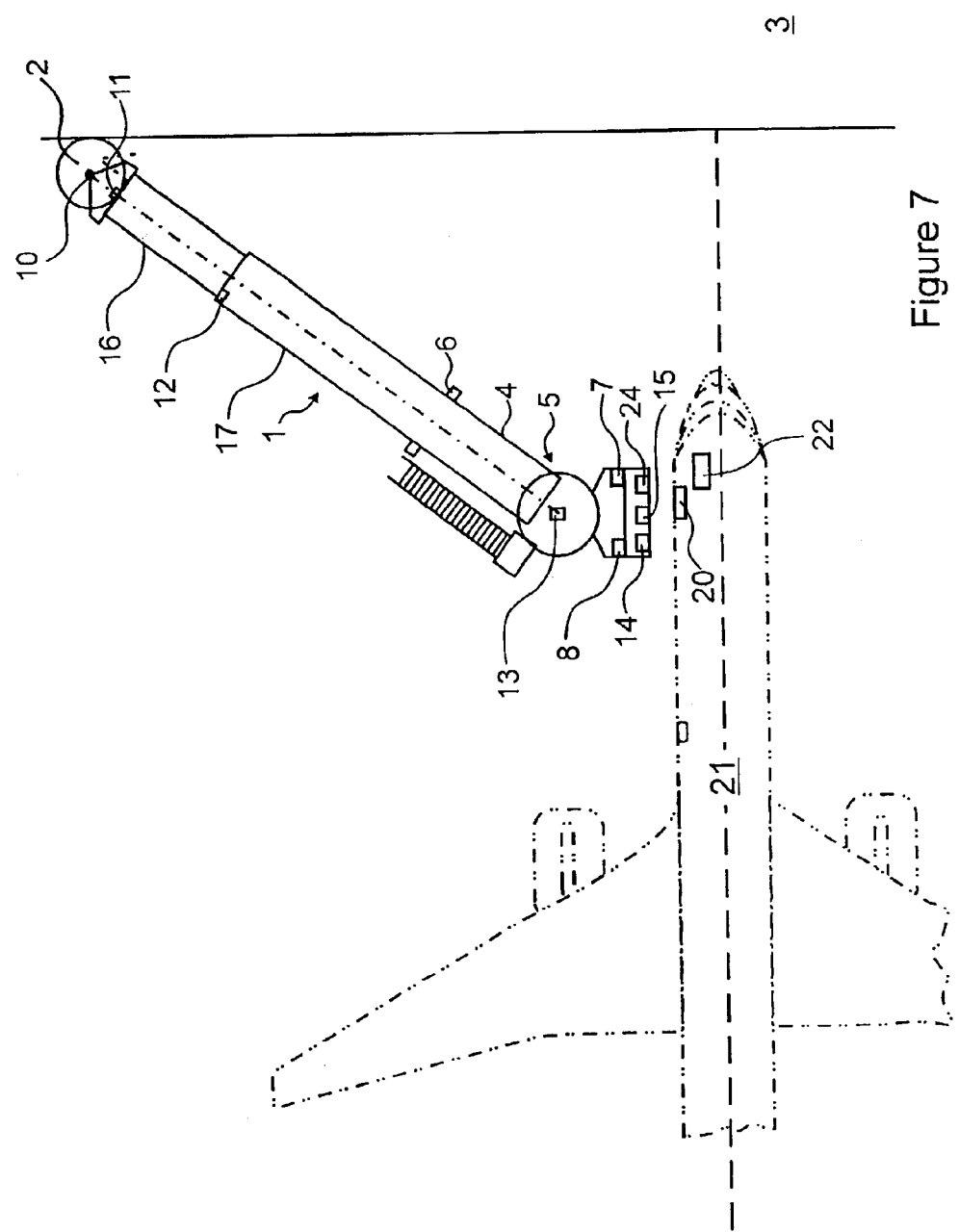
FIG. 7 is a top plan view of a passenger boarding bridge and an aircraft equipped with an automated docking system according to a third embodiment of the instant invention.

Referring now to FIG. 7, shown is a system according to a third embodiment of the instant invention. Elements labeled with the same numerals have the same function as those illustrated in FIG. 1. Aircraft 21 includes a transceiver 22 for transmitting one of an optical signal and an RF signal and for receiving one of an optical signal and an RF signal. Preferably, the transceiver 22 is disposed within a window (not shown) of the doorway 20 to which a passenger boarding bridge 1 is to be connected. The transceiver 22 is used only during the aircraft docking and passenger boarding bridge alignment operations. Passenger boarding bridge 1 includes a transceiver 24, for receiving the one of an optical signal and an RF signal transmitted from the aircraft 21 and for transmitting the one of an optical signal and an RF signal to be received by the transceiver 22 of aircraft 21. Accordingly, two-way communication occurs between the aircraft 21 and the passenger boarding bridge 1, which permits the implementation of active methods of alignment.

Figure 8A:
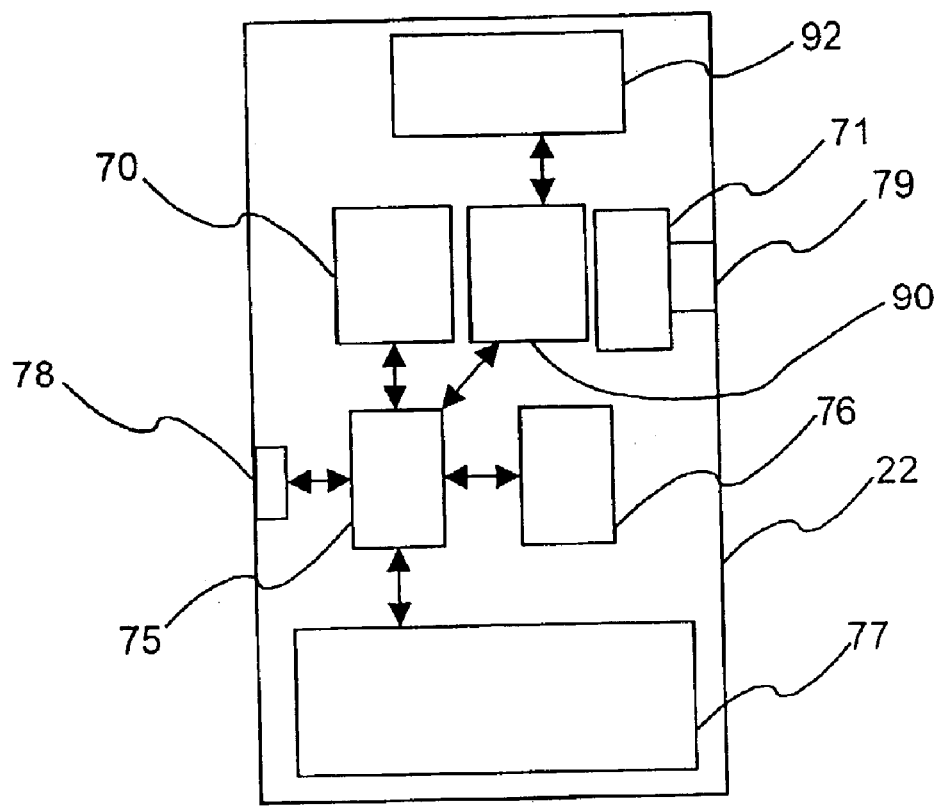
FIG. 8a is a schematic block diagram of a transceiver unit for use with the system illustrated in FIG. 7.

Referring now to FIG. 8a, shown is a transceiver 22 for use with the third embodiment of the instant invention. Elements labeled with the same numerals have the same function as those illustrated in FIG. 4a. Transceiver 22 additionally includes a receiver 90 in communication with the processor 75, and a display device 92 also in communication with the processor 75. For instance, the display device 92 is one of an LCD screen, an LED display and a speaker. The display device 92 is positioned for providing a human sensable indication to a member of the flight-crew on board the aircraft 21. The receiver 90 is for receiving signals from the passenger boarding bridge 1, and for providing said signals to the processor 75. For example, the receiver 90 is for receiving an alignment complete signal, which is provided to the processor 75. The processor 75, in use, provides a control signal to the display device 92 for indicating to the member of the flight-crew that the alignment operation is complete and that it is safe to open the doorway 20.

Figure 8B:
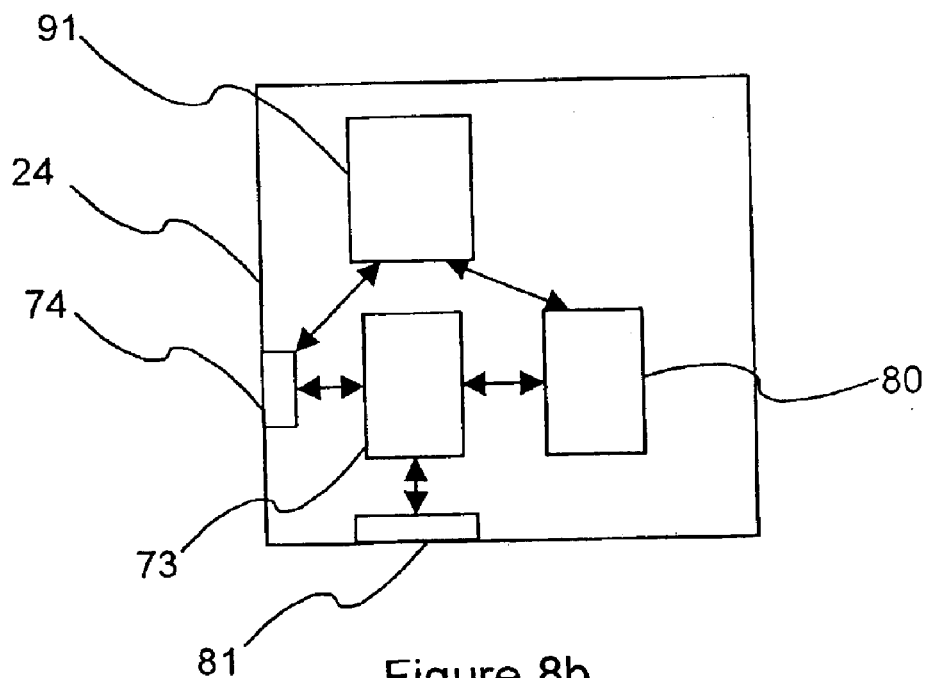
FIG. 8b is a schematic block diagram of a transceiver unit for use with the system illustrated in FIG. 7.

Referring now to FIG. 8b, shown is a transceiver 24 for use with the third embodiment of the instant invention. Elements labeled with the same numerals have the same function as those illustrated in FIG. 4b. Transceiver 24 additionally includes a transmitter 91 in communication with the data input/output port 74 and with the memory circuit 80. The transmitter 91 is for receiving data from the bridge controller 7 via the data input/output port 74 and/or the memory circuit, and for transmitting said received data to the aircraft 21.

Referring again to FIG. 7, the illustrated system is for use with active methods of alignment in which two-way communication occurs between the aircraft 21 and the passenger boarding bridge 1. In a first mode of operation of the system shown in FIG. 7, every type of aircraft uses a generic signal, which is a same signal for every type of aircraft. In use, the transceiver 22 emits the generic signal, which is received by the transceiver 24. The transceiver 24 provides the generic signal to the bridge controller 7. The bridge controller 7 uses the generic signal to align the cabin end of the passenger boarding bridge 1 with the doorway 20 of the aircraft 21. For example, the bridge controller actuates mechanisms of the passenger boarding bridge, so as to move the cabin end of the passenger boarding bridge into a position in which the transceiver 24 is precisely aligned with the transceiver 22. To this end, the transceiver 22 is preferably positioned at a same predetermined location relative to the outline of the doorway 20 for every type of aircraft 21, such that the passenger boarding bridge 1 is reliably aligned to the doorway whenever the transceiver 22 and the transceiver 24 are precisely aligned. Suitable methods for aligning the transceiver 22 with the transceiver 24 are discussed in greater detail, below.

In a second mode of operation of the system shown in FIG. 7, each different class of aircraft is assigned a class-specific signal, for instance the signal for a 737-700 is different from the signal for a 737-800 which is different from the signal for a 747-400 and so on. To this end, the transceiver 22 is configured to transmit the class-specific signal corresponding to the type of the aircraft 21. In use, the transceiver 22 emits the class-specific signal, which is received by the transceiver 22. The class-specific signal is provided to the bridge controller 7 and analyzed to determine information pertaining to certain attributes of the aircraft, such as for instance doorway height, front and rear doorway separation, expected stopping position of the type of aircraft, etc. Optionally, the bridge controller 7 uses the class-specific information to pre-set the passenger boarding bridge 1 to a predetermined position, in advance of the aircraft 21 coming to a complete stop.

Referring again to FIG. 8a, the transceiver 22 is in communication with a data entry device 77, for instance one of an alphanumeric keypad and an iconic keypad, for allowing a member of the flight-crew to enter ancillary information, such as for instance a number of passengers aboard the aircraft 21, to be transmitted by the transceiver 22. Advantageously, the bridge controller 7 can determine automatically whether or not the use of a second bridge, for example an over-the-wing bridge, when available, is desired based upon the number of passengers aboard the aircraft 21.

Figure 9A:
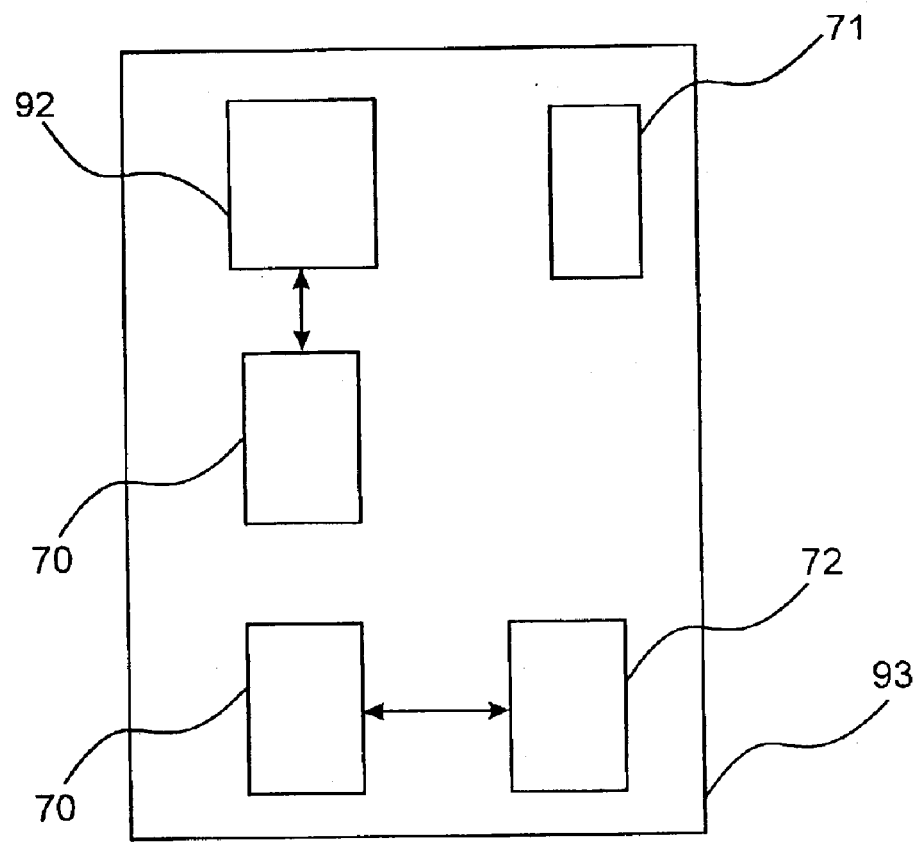
FIG. 9a is a schematic block diagram of another transceiver unit for use with the system illustrated in FIG. 7.

Referring now to FIG. 9a, shown is another transceiver for use with the third embodiment of the instant invention. Elements labeled with the same numerals have the same function as those illustrated in FIG. 2a. Transceiver 93 additionally includes a receiver 90 and a display device 92 also in communication with the processor 75. For instance, the display device 92 is in the form of one of an LCD screen, an LED display and a speaker. The receiver 90 is for receiving signals from the passenger boarding bridge 1, and for providing said signals to the processor 75. For example, the receiver 90 is for receiving an alignment complete signal, which is provided to the processor 75. The processor 75, in use, provides a control signal to the display device 92 for indicating to a member of the flight-crew that the alignment operation is complete and that it is safe to open the doorway 20.

Figure 9B:
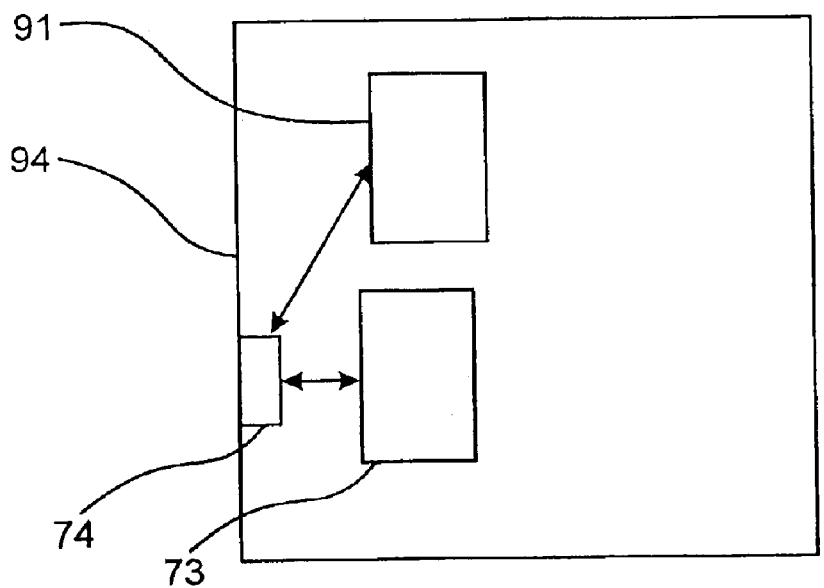
FIG. 9b is a schematic block diagram of another transceiver unit for use with the system illustrated in FIG. 7.

Referring now to FIG. 9b, shown is another transceiver for use with the third embodiment of the instant invention. Elements labeled with the same numerals have the same function as those illustrated in FIG. 2b. Transceiver 94 additionally includes a transmitter 91 in communication with the data input/output port 74. The transmitter 91 is for receiving data from the bridge controller 7 via the data input/output port 74 and for transmitting said data to the aircraft 21. For example, the transmitter 91 is for transmitting the alignment complete signal after the passenger boarding bridge 1 is aligned with the doorway 20 of the aircraft 21.

Figure 10:
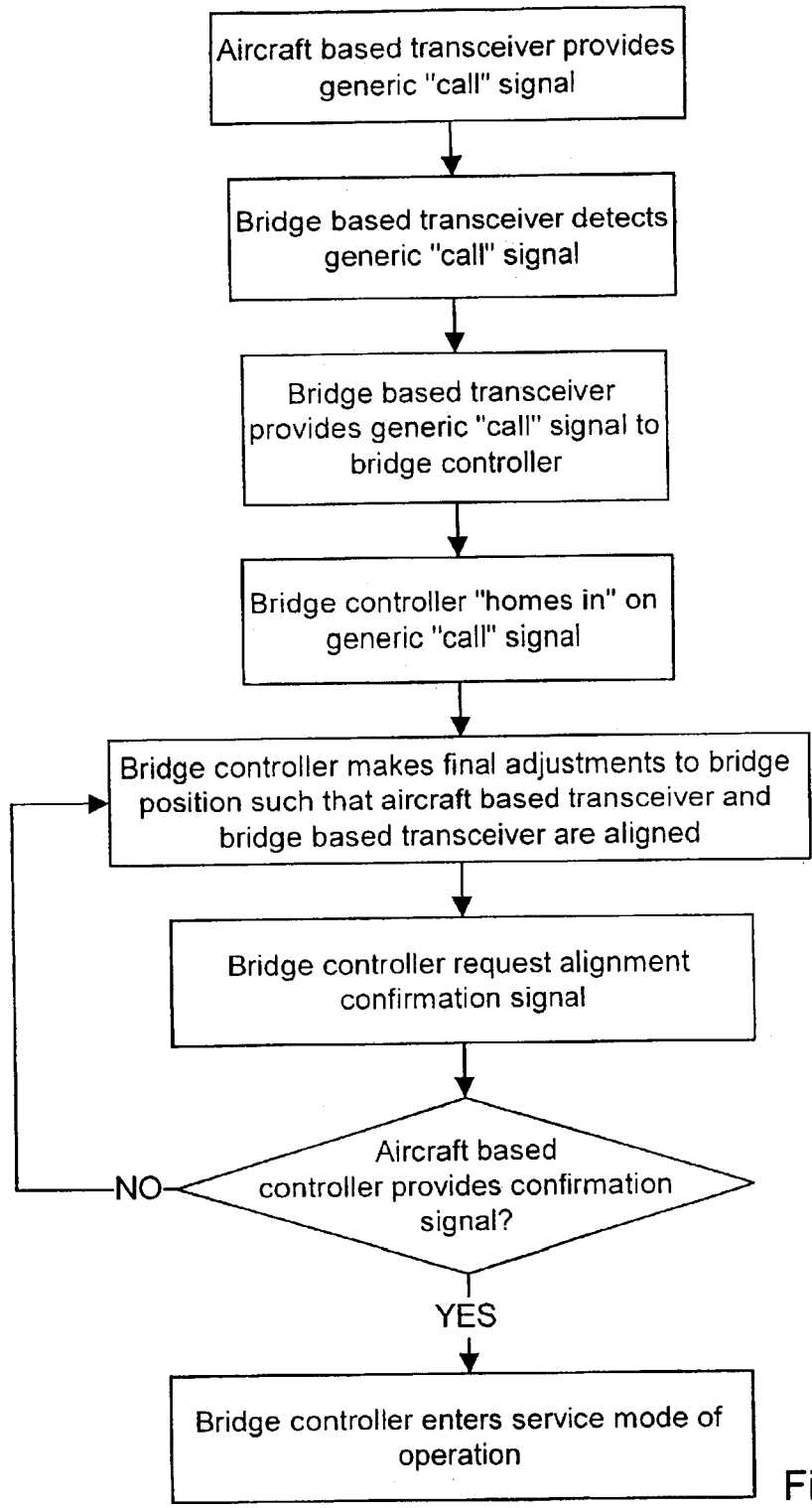
FIG. 10 is a simplified flow diagram of a method of aligning a passenger boarding bridge to a doorway of an aircraft using the system described with reference to FIG. 7.

Referring now to FIG. 10, shown is a method of aligning the passenger boarding bridge 1 with the doorway 20 of the aircraft 21 using the system illustrated in FIG. 7. The method is described with specific reference to transceivers 22 and 24, however, the method is equally applicable when transceiver 93 replaces transceiver 22 and/or transceiver 94 replaces transceiver 24. The transceiver 22 transmits a generic "call" signal to the transceiver 24. The transceiver 24 provides the generic "call" signal to the bridge controller 7. In dependence upon receiving the generic "call" signal, the bridge controller 7 "wakes up" from a standby mode and enters an alignment mode of operation. The bridge controller 7 adjusts the vertical and horizontal position of the passenger boarding bridge such that the transceiver 24 becomes precisely aligned with the transceiver 22. After making final adjustments to the passenger boarding bridge 1 position, the bridge controller uses transceiver 24 to emit an alignment confirmation request signal to transceiver 22 aboard the aircraft 21. If the transceiver 22 returns a confirmation signal, then the alignment operation is complete, and the bridge controller 7 preferably enters a service mode of operation. The service mode of operation includes functions such as auto-leveling the passenger boarding bridge 1 during the enplaning and/or deplaning operations, etc. If the transceiver 22 returns an "alignment incomplete" signal, then the bridge controller further adjusts the position of the passenger boarding bridge 1, and re-sends the alignment confirmation request signal. Preferably, after a predetermined number of failed alignment attempts, the bridge controller automatically transmits a signal for requesting manual bridge alignment.

Optionally, the bridge controller 7 receives other signals from the range measuring device 14 and the one or more pressure sensors 15, such that the rate of approach of the passenger boarding bridge 1 to the aircraft 21 is optionally automatically reduced as the distance to the aircraft 21 decreases.

Figure 11:
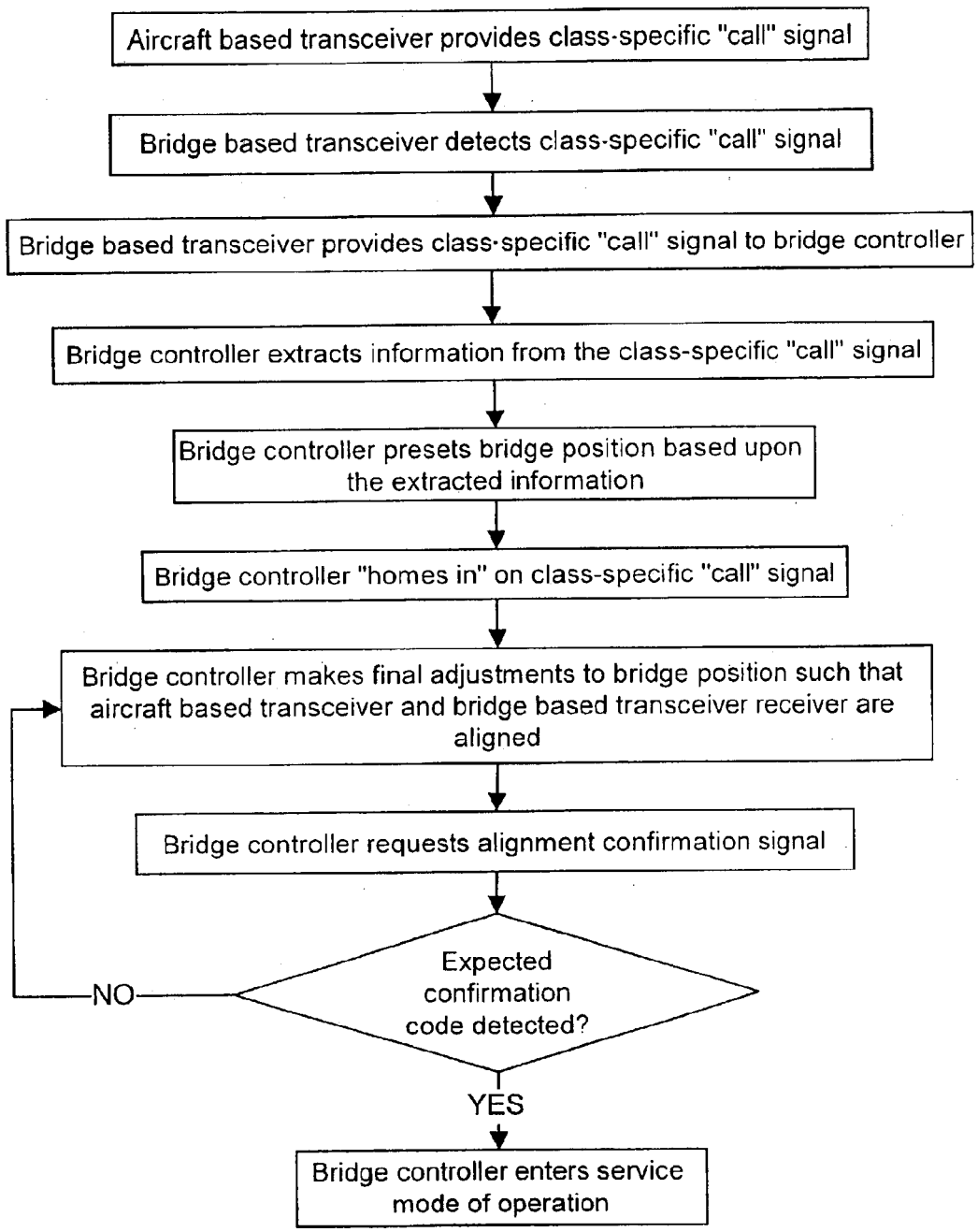
FIG. 11 is a simplified flow diagram of another method of aligning a passenger boarding bridge to a doorway of an aircraft using the system described with reference to FIG. 7.

Referring now to FIG. 11, shown is another method of aligning the passenger boarding bridge 1 with the doorway 20 of the aircraft 21 using the system illustrated in FIG. 7. The method is described with specific reference to transceivers 22 and 24, however, the method is equally applicable when transceiver 93 replaces transceiver 22 and/or transceiver 94 replaces transceiver 24. The transceiver 22 transmits a class-specific "call" signal to the transceiver 24, wherein the class-specific "call" signal includes information relating to certain attributes of the aircraft, such as for instance doorway height, front and rear doorway separation, expected stopping position etc. The transceiver 24 provides the class-specific "call" signal to the bridge controller 7. In dependence upon receiving the class-specific "call" signal, the bridge controller 7 "wakes up" from a standby mode and enters an alignment mode of operation. The bridge controller 7 analyzes the class-specific "call" signal to extract the information pertaining to certain attributes of the aircraft. Based on the extracted information, the bridge controller 7 pre-sets the passenger boarding bridge to a position close to the expected stopping position of the doorway 21 of the aircraft 20. The final adjustments to align the passenger boarding bridge 1 to the doorway 21 of the aircraft 20 are performed by "homing in" on the class-specific "call" signal being transmitted by the transceiver 22. The passenger boarding bridge 1 is aligned when the vertical and horizontal position of the passenger boarding bridge is such that the transceiver 24 is precisely aligned with the transceiver 22. After making final adjustments to the passenger boarding bridge 1 position, the bridge controller uses transceiver 24 to emit an alignment confirmation request signal to transceiver 22 aboard the aircraft 21. If the transceiver 22 returns a confirmation signal, then the alignment operation is complete, and the bridge controller 7 preferably enters a service mode of operation. The service mode of operation includes functions such as auto-leveling the passenger boarding bridge 1 during the enplaning and/or deplaning operations, etc. If the transceiver 22 returns an "alignment incomplete" signal, then the bridge controller further adjusts the position of the passenger boarding bridge 1, and re-sends the alignment confirmation request signal. Preferably, after a predetermined number of failed alignment attempts, the bridge controller automatically transmits a signal for requesting manual bridge alignment.

Optionally, the bridge controller 7 receives other signals from the range measuring device 14 and the one or more pressure sensors 15, such that the rate of approach of the passenger boarding bridge 1 to the aircraft 21 is optionally automatically reduced as the distance to the aircraft 21 decreases.

Figure 12:
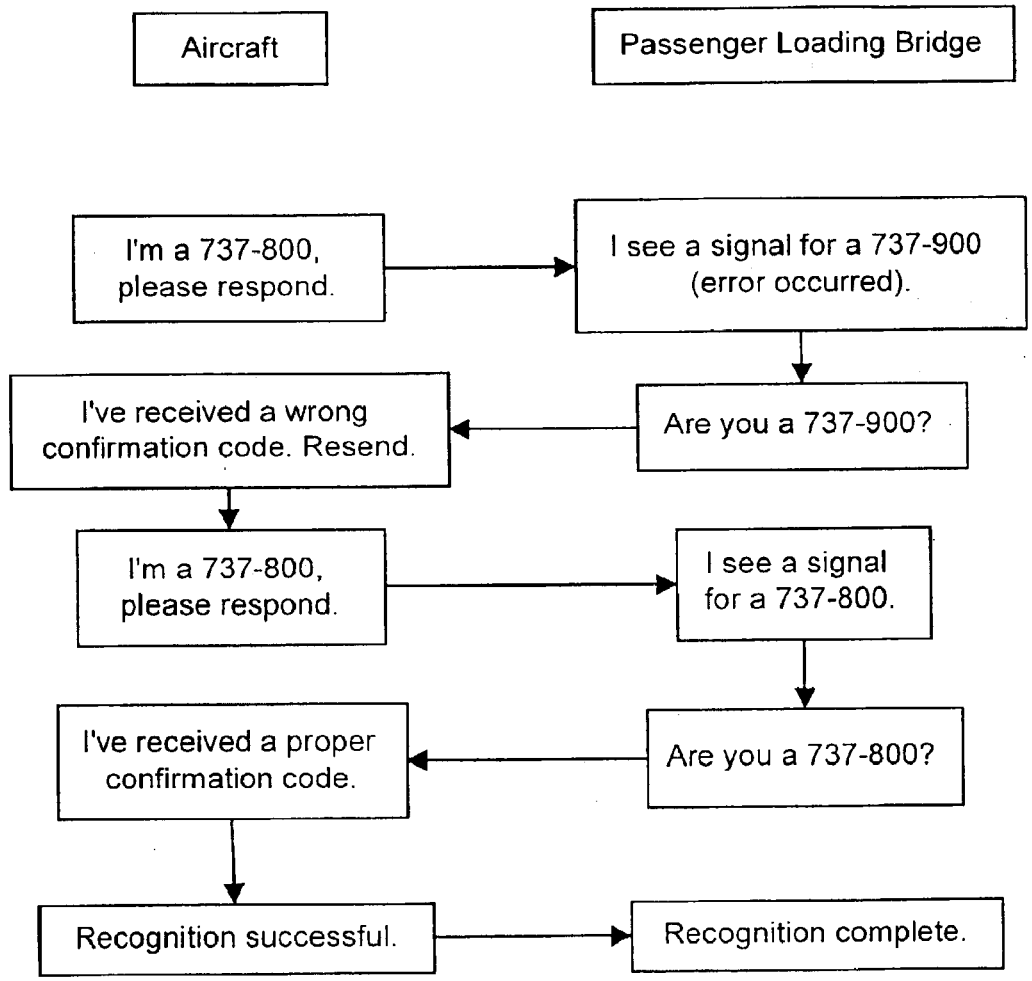
FIG. 12 is a simplified data flow diagram illustrating the sequence of steps involved in confirming a type of the aircraft using the system described with reference to FIG. 7.

Still further optionally, enhanced two-way communication is provided between the aircraft 21 and the passenger boarding bridge 1, such that every signal that the transceiver 22 emits is confirmed by the transceiver 24. FIG. 12 shows simplified flow diagram of a preferred two-way communications scheme, using the specific and non-limiting example of confirming the class of the aircraft. The transceiver 22 of aircraft 21 emits a' signal for a 737-800, which is received by the transceiver 24 of the passenger boarding bridge 1. Transceiver 24 receives the signal, recognizes the aircraft 21 as a 737-900, and emits a confirmation signal to the transceiver 22 indicating that a 737-900 has been acknowledged. Transceiver 22 receives the confirmation signal and recognizes that the transceiver 22 has transmitted an incorrect confirmation signal. The transceiver 22 of aircraft 21 re-emits a signal for a 737-800, which is received and correctly recognized by the transceiver 24. Transceiver 24 emits a confirmation signal to the transceiver 22 indicating that a 737-800 has been acknowledged and requesting confirmation. Transceiver 22 emits a confirmation signal, thereby completing the recognition sequence. Of course, a number of steps greater than or less than the number of steps illustrated in the above example may in practice be necessary to successfully complete a two-way communication.

Figure 13:
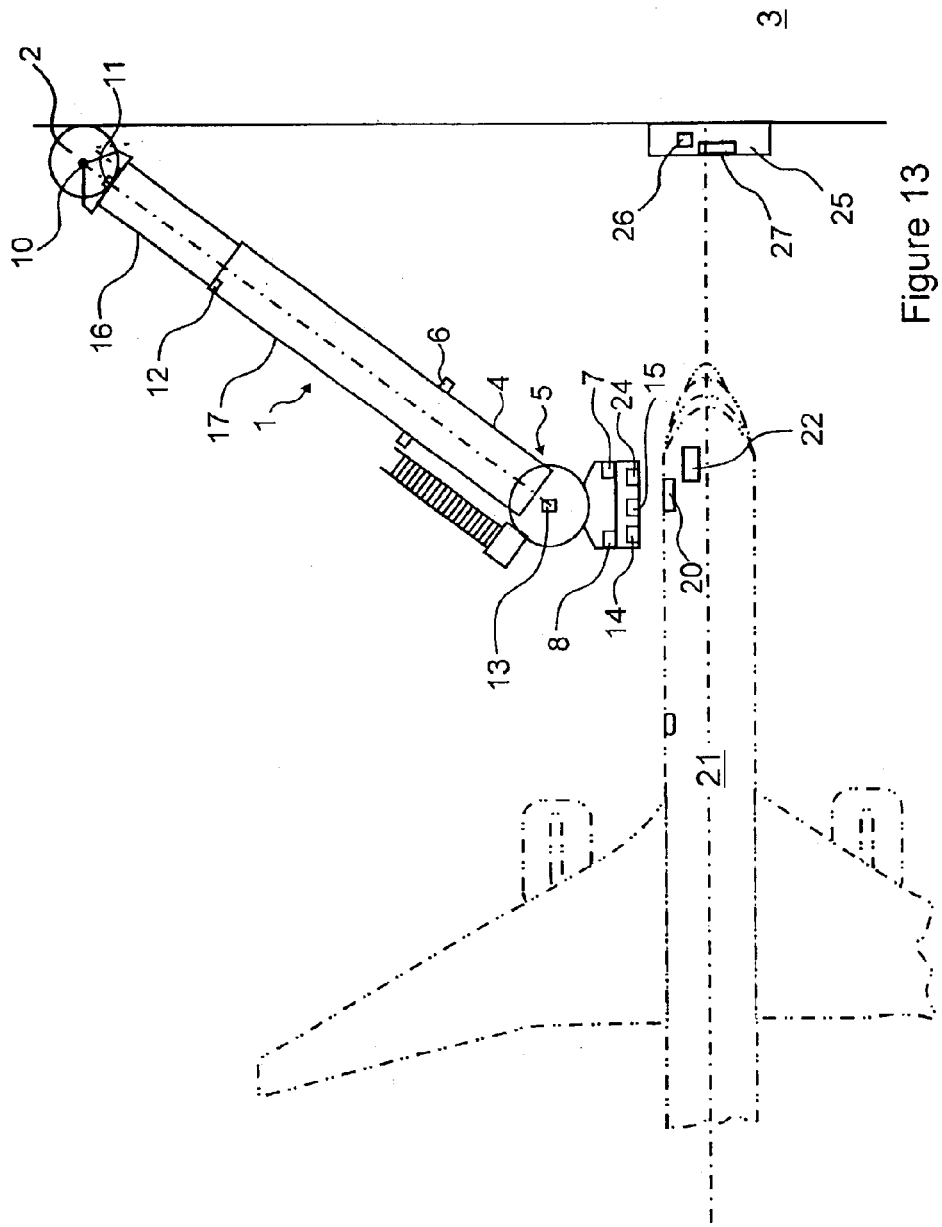
FIG. 13 is a schematic top view of a passenger boarding bridge and an aircraft equipped with an automated docking system according to a fourth embodiment of the instant invention.

Referring now to FIG. 13, shown is a system according to a fourth embodiment of the instant invention. Elements labeled with the same numerals have the same function as those illustrated in FIG. 7. The system according to the fourth embodiment includes a transceiver 22 aboard the aircraft 21, a transceiver 24 carried near a cabin end of passenger boarding bridge 1, and a Central Control Unit (CCU) 25 including a transceiver 26 and a display device 27. The transceivers 22, 24 and 26 are optionally one of an optical transceiver for transmitting and receiving optical signals, and a radio frequency (rf) transceiver for transmitting and receiving RF signals.

In a preferred embodiment, the CCU 25 is disposed along an exterior surface of the terminal building 3, wherein the CCU 25 is in communication with the bridge controller 7 of the passenger boarding bridge via a not illustrated communications cable. Optionally, two-way free-space communication occurs between the transceiver 26 of the CCU 25 and transceiver 24 of the bridge 1. Every CCU 25 is responsible for a passenger boarding bridge 1 and for a predetermined section of space adjacent the passenger boarding bridge. Whenever an aircraft 21 enters this predetermined section of space, the CCU 25 coordinates communication between the approaching aircraft 21 and the passenger boarding bridge 1.

In use, the transceiver 22 aboard the aircraft 21 transmits a "call" signal as described supra. The "call" signal is received by the transceiver 26 of the CCU 25. Preferably, the "call" signal is a class specific "call" signal, which includes data relating to the class of the aircraft 21. The CCU 25 also senses positional and trajectory information relating to the approaching aircraft 21. To this end, additional not illustrated sensors are disposed on or about the CCU 25 for sensing the approach of the aircraft 21. Based upon the received "call" signal and the sensed approach information relating to the aircraft 21, the CCU 25 determines instructions for guiding the approaching aircraft 21 to an expected stopping position for the specific class of aircraft. Furthermore, the CCU 25 formats the instructions and uses display device 27 to display said formatted instructions, so as to provide to the pilot instructions for parking the aircraft 21 at an expected stopping position for the type of aircraft 21, in a substantially manual fashion.

Once the aircraft 21 is parked, the passenger boarding bridge 1 is aligned with the doorway 20 of the aircraft 21. Specifically, the CCU 25 transmits signals to the passenger boarding bridge for guiding the cabin end of the bridge toward the aircraft 21. The signals include information received from the transceiver 22 and from the not illustrated sensors disposed on or about the CCU 25. The bridge controller 7 receives the signals from the CCU 25 and uses the received signals in combination with the control signals provided by the bridge transducers 10, 11, 12, 13 to align the cabin end of the passenger boarding bridge 1 with the doorway 20 of the aircraft 21.

Preferably, the pilot can deactivate the system described with reference to FIG. 13 by activating a master switch (not shown) located aboard the aircraft 21, preferably within the flight deck of aircraft 21. When the pilot has deactivated the system, the aircraft 21 emits a "not active" signal as it approaches the parking area. In turn, the CCU 25 instructs the pilot to stop, and to wait for ground crew to prepare for a manned or a semi-automated docking sequence.

Figure 14:
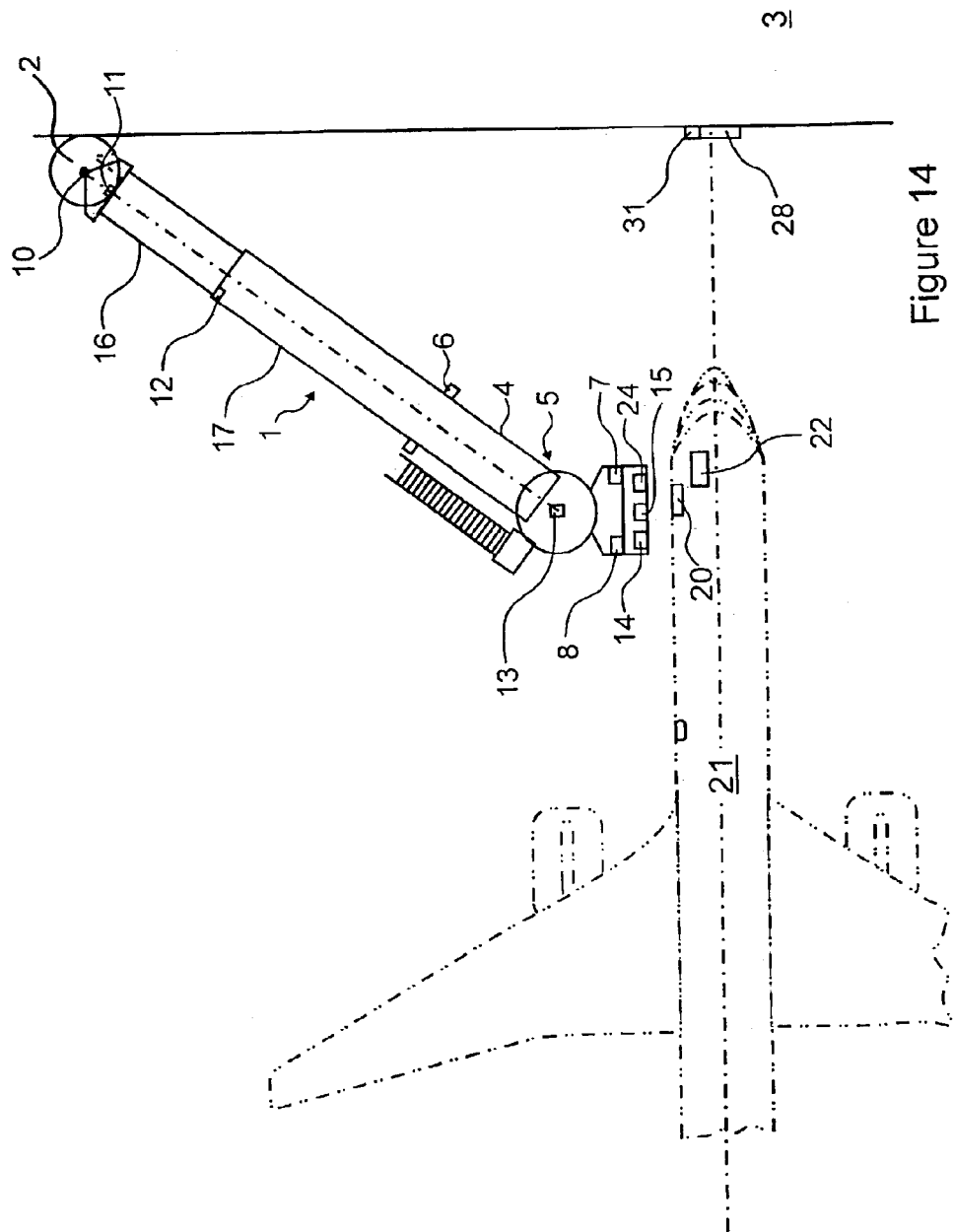
FIG. 14 is a schematic top view of a passenger boarding bridge and an aircraft equipped with an automated docking system according to a fifth embodiment of the instant invention.

Referring to FIG. 14, shown is a system according to a fifth embodiment of the instant invention. Elements labeled with the same numerals have the same function as those illustrated in FIG. 13. This system allows the aircraft 21 to make its final approach to a docking area adjacent the passenger boarding bridge 1 without any assistance from a flight crew or airport ground crew member. The system according to the fifth embodiment includes a transceiver 22 aboard aircraft 21, a transceiver 24 carried near a cabin end of passenger boarding bridge 1, and a Central Control Unit (CCU) 28 including a stationary transceiver 31. The stationary transceiver 31 is for providing two-way communication between the CCU 28 and the aircraft 21 via the transceiver 22. The transceivers 22, 24 and 31 are optionally one of an optical transceiver for transmitting and receiving optical signals, and a radio frequency (rf) transceiver for transmitting and receiving RF signals.

In a preferred embodiment, the CCU 28 is disposed along an exterior surface of the terminal building 3, wherein the CCU 28 is in communication with the bridge controller 7 of the passenger boarding bridge via a not illustrated communications cable. Optionally, two-way free-space communication occurs between the stationary transceiver 31 of the CCU 28 and transceiver 24 of the bridge 1. Every CCU 28 is responsible for a passenger boarding bridge 1 and for a predetermined section of space adjacent the passenger boarding bridge. Whenever an aircraft 21 enters this predetermined section of space, the CCU 28 assumes control over taxiing functions of the aircraft 21, so as to guide the aircraft 21 to an expected stopping position in an automated matuer.

In use, the transceiver 22 aboard the aircraft 21 transmits a "call" signal as described supra. The "call" signal is received by the stationary transceiver 31 of the CCU 28. Preferably, the "call" signal is a class specific "call" signal, which includes data relating to the class of the aircraft 21. The CCU 28 also senses positional and trajectory information relating to the approaching aircraft 21. To this end, additional sensors (not shown) are disposed on or about the CCU 28 for sensing the approach of the aircraft 21. Based upon the received "call" signal and the sensed approach information relating to the aircraft 21, the CCU 28 determines instructions for guiding the approaching aircraft 21 to an expected stopping position for the specific class of aircraft. Furthermore, the CCU 28 uses stationary transceiver 31 to emit a control signal for reception by transceiver 22 aboard the aircraft 21. In the instant embodiment, the transceiver 22 is in communication with the central computer (not shown) of the aircraft 21, such that the CCU 28 may control the aircraft 21 remotely. In this fashion, the CCU 28 controls the aircraft 21 during its approach to the expected stopping position adjacent the passenger boarding bridge 1.

The CCU 28 provides to the bridge controller 7 of the passenger boarding bridge 1, via the transceiver 24, the data relating to the class of the aircraft 21 as well as the sensed positional and trajectory information relating to the approaching aircraft 21. For instance, the data relating to the class of the aircraft 21 includes doorway height, front and rear doorway separation, expected stopping position of the type of aircraft, etc. Accordingly, the passenger boarding bridge may begin moving toward the expected stopping position of the aircraft 21 in advance of the aircraft 21 coming to a complete stop. Final adjustments for aligning the passenger boarding bridge 1 to the doorway of the aircraft are performed under the control of the bridge controller 7 using signals provided from proximity sensors located near the cabin end of the bridge. The proximity sensors are used to determine the exact position of the aircraft doorway 20, and to activate a bridge auto level system (not shown) after the bridge is aligned. The bridge 1 will also carry safety sensors (not shown), which will ensure that there is no unwanted contact between the aircraft 21 and the bridge 1. Preferably, the system is designed such that a closed communication circuit exists between the aircraft 21, the CCU 28 and the bridge 1.

Furthermore, the pilot can deactivate the system described with reference to FIG. 4 by activating a master switch located aboard the aircraft 21, preferably within the flight deck of aircraft 21. If the pilot has deactivated the system, then the aircraft 21 emits a "not active" signal when it approaches the parking area. In turn, the CCU 28 instructs the pilot to stop, and to wait for ground crew to prepare for a manned or a semi-automated docking sequence.

Figure 15:
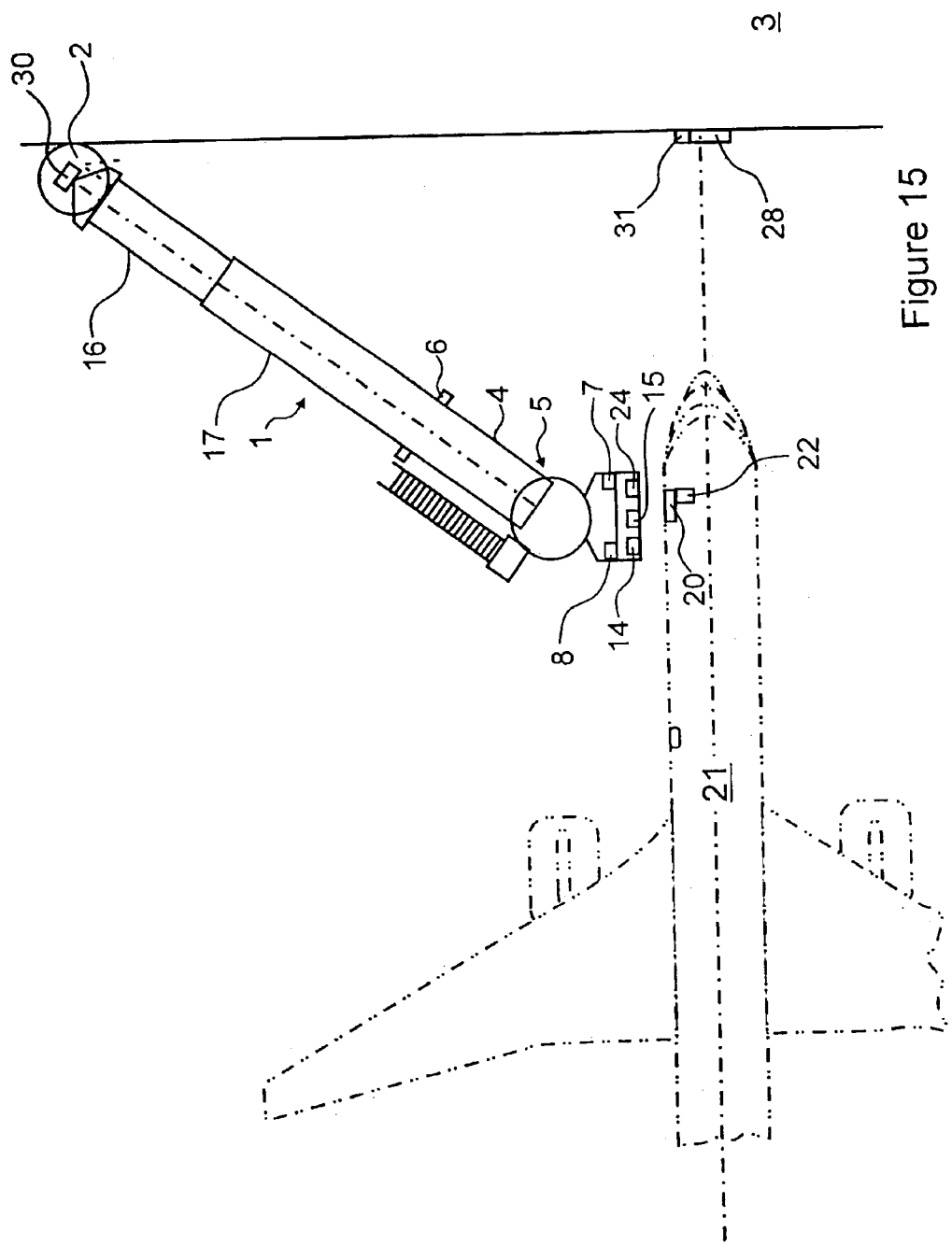
FIG. 15 is a schematic top view of a passenger boarding bridge and an aircraft equipped with an automated docking system according to a sixth embodiment of the instant invention.

Referring to FIG. 15, shown is a system according to a sixth embodiment of the instant invention. Elements labeled with the same numerals have the same function as those illustrated in FIG. 14. According to the sixth embodiment a fourth transceiver 30 is provided at a stationary point along the passenger boarding bridge 1. Optionally, the fourth transceiver 30 is positioned at a stationary point being other than along the passenger boarding bridge 1, such as for instance along a wall surface of the terminal building 3. Advantageously, triangulation methods may be used to determine the position of either one of the non-stationary transceivers 22 and 24, based upon the known positions of the fourth transceiver 30 and the stationary transceiver 31. In this way, the transceiver 24 can be guided to arrive at a same point occupied by transceiver 22, so as to engage the cabin end of the passenger boarding bridge 1 with the doorway 20 of aircraft 21.

It is an advantage of the third through sixth embodiments of the instant invention that an authorized user may reconfigure the transceiver 22, so as to change the class specific signal that is emitted, in order to accommodate a different class of aircraft. Accordingly, one type of transceiver 22 can be manufactured and subsequently configured by an authorized user to represent a desired class of aircraft. Furthermore, if an aircraft type is retired or otherwise changed, then the transceiver 22 can be salvaged and reconfigured for use with a different type of aircraft. Of course, the reconfiguration of the transceiver 22 requires correct authorization, in order to ensure safe operation of the system. Further advantageously, the transceiver 22 supports use with a large plurality of types of aircraft. For example, using a simple 8 bit-encoding scheme, it is possible to represent 256 different types of aircraft.

The first through sixth embodiments of the instant invention, as described above, involve aligning the receiver unit 23,33 or transceiver unit 24,94 carried by the passenger boarding bridge 1 with the transmitter unit 29,39 or transceiver unit 22,93 carried by the aircraft 21. Some methods suitable for performing such an alignment operation are discussed in greater detail below, by way of specific and non-limiting examples.

Figure 16A:
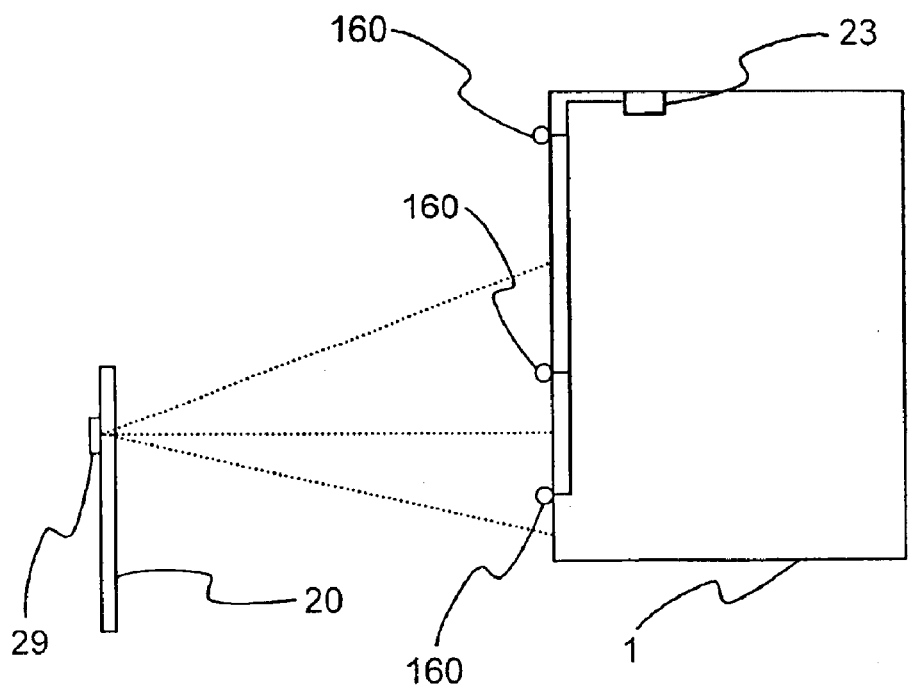
FIG. 16a is a simplified side view showing a first method of aligning a passenger boarding bridge to an aircraft doorway, prior to alignment.
Figure 16B:
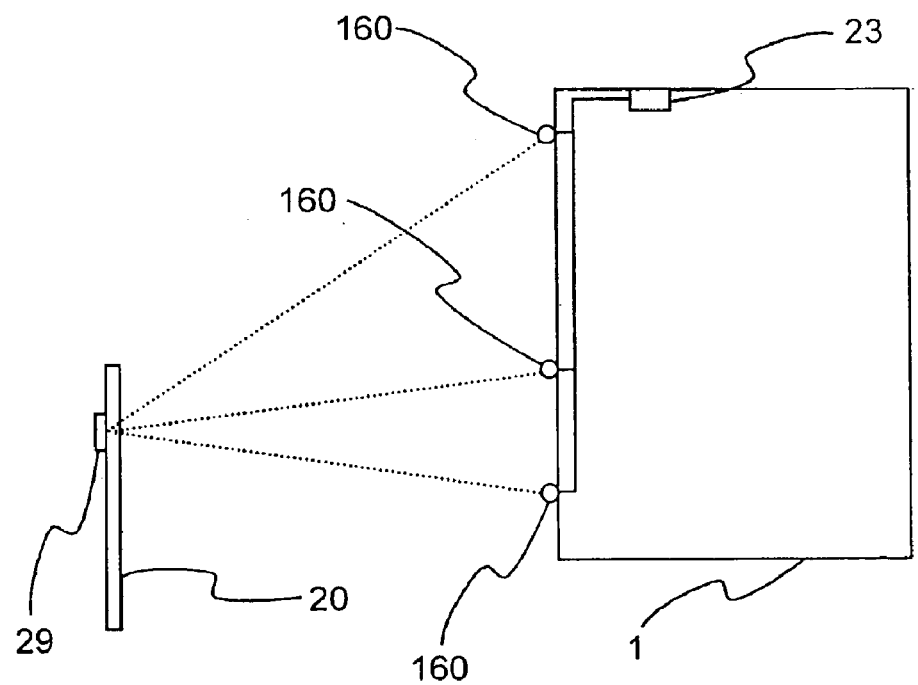
FIG. 16b is a simplified side view showing a first method of aligning a passenger boarding bridge to an aircraft doorway, in which the passenger boarding bridge and the aircraft doorway are aligned.

Referring now to FIGS. 16a and 16b, shown is a first method of aligning the receiver unit 23,33 or transceiver unit 24,94 carried by the passenger boarding bridge 1 with the transmitter unit 29,39 or transceiver unit 22,93 carried by the aircraft 21. In this specific example, the wireless receiver 73 of the illustrated receiver unit 23 includes a plurality of sensors 160 disposed about the passenger boarding bridge 1, each sensor 160 in operative communication with the receiver unit 23. The transmitter unit 29 includes a wireless transmitter 70, which wireless transmitter 70 is configured for providing a plurality of optical signals, each optical signal directed to propagate along a different path. The aircraft engaging end of the bridge 1 is moved, thereby moving the plurality of sensors 160 until each sensor 160 detects an optical signal of the plurality of optical signals. When the bridge 1 is precisely aligned with the doorway of the aircraft in the horizontal and vertical directions, then the bridge controller extends the aircraft engaging end of the bridge 1 directly toward the aircraft 21 until the inductive proximity sensors (not shown) indicate close approach of the bridge 1 to the aircraft, at which time the rate of approach is decreased automatically. A pressure sensor (not shown) stops the movement of the bridge upon contact with the aircraft 21.

Referring now to FIGS. 17a and 17b, shown is a second method of aligning the receiver unit 23,33 or transceiver unit 24,94 carried by the passenger boarding bridge 1 with the transmitter unit 29,39 or transceiver unit 22,93 carried by the aircraft 21 involving the use of a direction indicating receiver. In the specific example shown in FIG. 17, the transmitter unit 29 and the receive unit 23 are illustrated. The transmitter unit 29 emits an optical signal, for instance a directed beam optical signal 161. Optionally, the optical signal is not a directed beam, and the receiver unit 23 includes a lens (not shown) for focusing the optical signal onto a detector element, for instance a charge couple device (CCD) detector 162 of the receiver unit 23. The CCD detector 162 comprises a plurality of rows (not shown) and a plurality of columns (not shown) of CCD elements. For simplicity, only one CCD element 163 is illustrated. Then, the element on the CCD at which the optical signal impinges is indicative of an alignment status. If the optical signal source of the transmitter unit 29 is at a same height as the detector element 163 of the receiver unit 23, that is when in alignment, then the bridge is raised until the CCD element 163 in a predetermined row is "lit" by the optical signal. Next, the end of the bridge is moved laterally until the CCD element 163 in a predetermined column is "lit". Accordingly, a single CCD element 163 is "lit" at the correct row and column. Then the bridge is moved toward the transmitter unit 29 along a straight path. If more than one sensor becomes "lit", then the alignment process outlined above is performed to realign the bridge to the doorway of the aircraft. When the end of the bridge is in close proximity to the aircraft, as indicated by proximity sensors, more than one CCD element may be "lit", and the average locations of the more than one "lit" CCD element is used. Of course, the position of the end of the bridge 1 is repeatedly adjusted as the bridge is extended toward the aircraft, such that any angular misalignment between the end of the bridge 1 and the aircraft doorway 21 is corrected.

Referring now to FIG. 18, shown is a third method of aligning the receiver unit 23,33 or transceiver unit 24,94 carried by the passenger boarding bridge 1 with the transmitter unit 29,39 or transceiver unit 22,93 carried by the aircraft 21 involving a triangulation method. Triangulation is a process by which the location of a radio transmitter can be determined by measuring either the radial distance, or the direction, of the received signal from two or three different points. In the specific example shown in FIG. 18, the transceiver 22 and the transceiver 24 are illustrated as the moveable transceivers, and transceiver 26 is stationary. Preferably, the transceivers 24 and 26 each include a directional antenna.

Figure 19A:
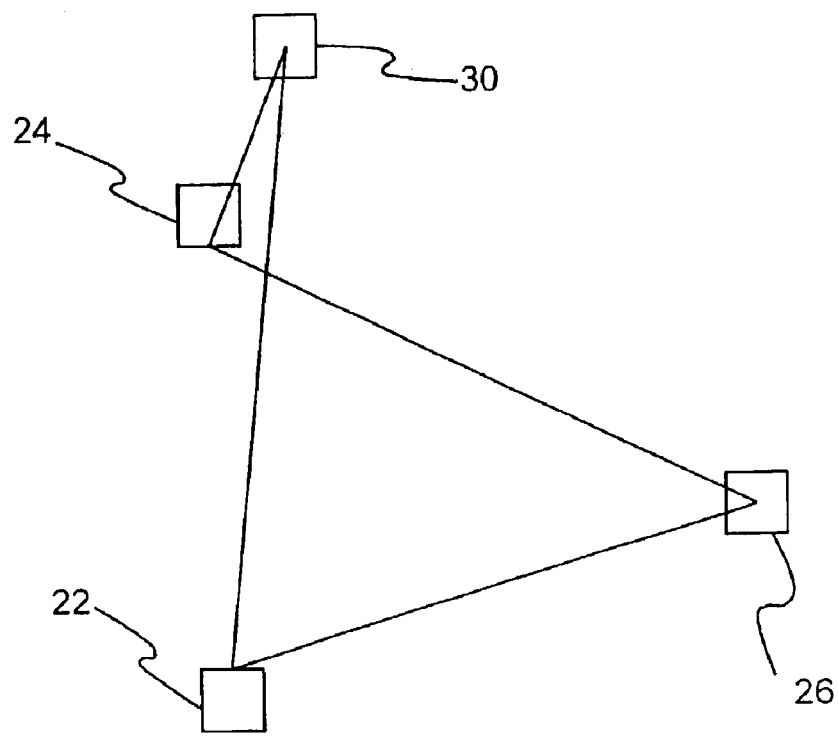
FIG. 19a is a simplified diagram showing a second triangulation method for aligning a passenger boarding bridge to an aircraft doorway, prior to alignment.
Figure 19B:
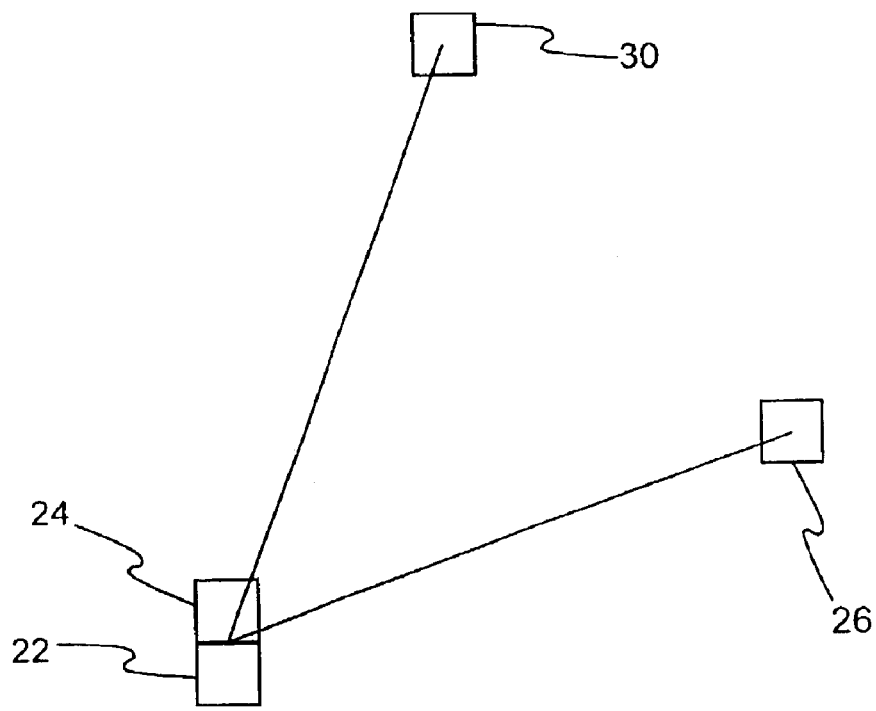
FIG. 19b is a simplified diagram showing a second triangulation method for aligning a passenger boarding bridge to an aircraft doorway, in which the passenger boarding bridge and the aircraft doorway are aligned.

Referring now to FIGS. 19a and 19b, shown is a fourth method of aligning the receiver unit 23,33 or transceiver unit 24,94 carried by the passenger boarding bridge 1 with the transmitter unit 29,39 or transceiver unit 22,93 carried by the aircraft 21 involving a triangulation method. Triangulation is a process by which the location of a radio transmitter can be determined by measuring either the radial distance, or the direction, of the received signal from two or three different point. In the specific example shown in FIGS. 19a and 19b, the transceiver 22 and the transceiver 24 are illustrated as the moveable transceivers, and transceivers 26 and 30 are stationary. The exact position of each transceiver 22,24 is determined as described with reference to FIG. 18, and the passenger boarding bridge is adjusted until the transceiver 24 carried at the aircraft engaging end thereof is substantially adjacent the transceiver 22 aboard the aircraft 21.

Optionally, a Biris (bi-iris) system, i.e. imaging onto a position sensitive photodetector through an apertured mask, is used to measure location and distance. The Biris system uses a laser to form a target as well as a dual iris detector for forming an image with two separately imaged views of the target. This permits verification of target position and increased accuracy. An advantage of the Biris system is its small size and the robustness of the range sensor.

Of course, when the type of the aircraft 21 is known, for example when the transceiver 22 aboard the aircraft transmits a class specific "call" signal, then the passenger boarding bridge can be preset to a position close to the expected stopping position of the doorway 20 of the aircraft 21. The final adjustments can be made by using the transceiver 24 aboard the passenger boarding bridge to home in on the transceiver 22 based upon the signal strength of the signal being transmitted by the transceiver 24. Accordingly, it is possible to align the passenger boarding bridge to the doorway 20 of the aircraft 21 using a system comprising at minimum a single transmitter aboard the aircraft 21 and a single receiver aboard the passenger boarding bridge. Optionally, the passenger boarding bridge is preset to a correct height for the specific type of aircraft in dependence upon the class specific "call" signal, and only the horizontal position of the passenger boarding bridge is adjusted by "homing in" on the "call" signal.

It is a further advantage of the instant invention that the use of optical signals and/or RF signals for aligning the passenger boarding bridge 1 with the doorway 20 of aircraft 21 does not pose any danger to the vision of flight crew members, passengers or ground crew members. When optical signals are used, such as for instance infrared signals, interference with airport communication systems, flight navigation systems and/or the operations of nearby passenger boarding bridges is avoided. Still further advantageously, for the expected operating distances of the instant invention, the infrared signals are substantially unaffected by adverse environmental conditions such as snow, fog, rain, darkness, etc. Preferably, the infrared transceivers and/or receivers are in communication with temperature compensating circuits, so as to allow reliable operation over a wide range of temperature values.

Furthermore, the ancillary information transmitted from the aircraft based transmitter unit to the passenger boarding bridge can be used in an automated airport billing system, wherein an airline is billed according to the number of seats and/or the number of passengers aboard each flight that is serviced by the passenger boarding bridge.

Figure 20:
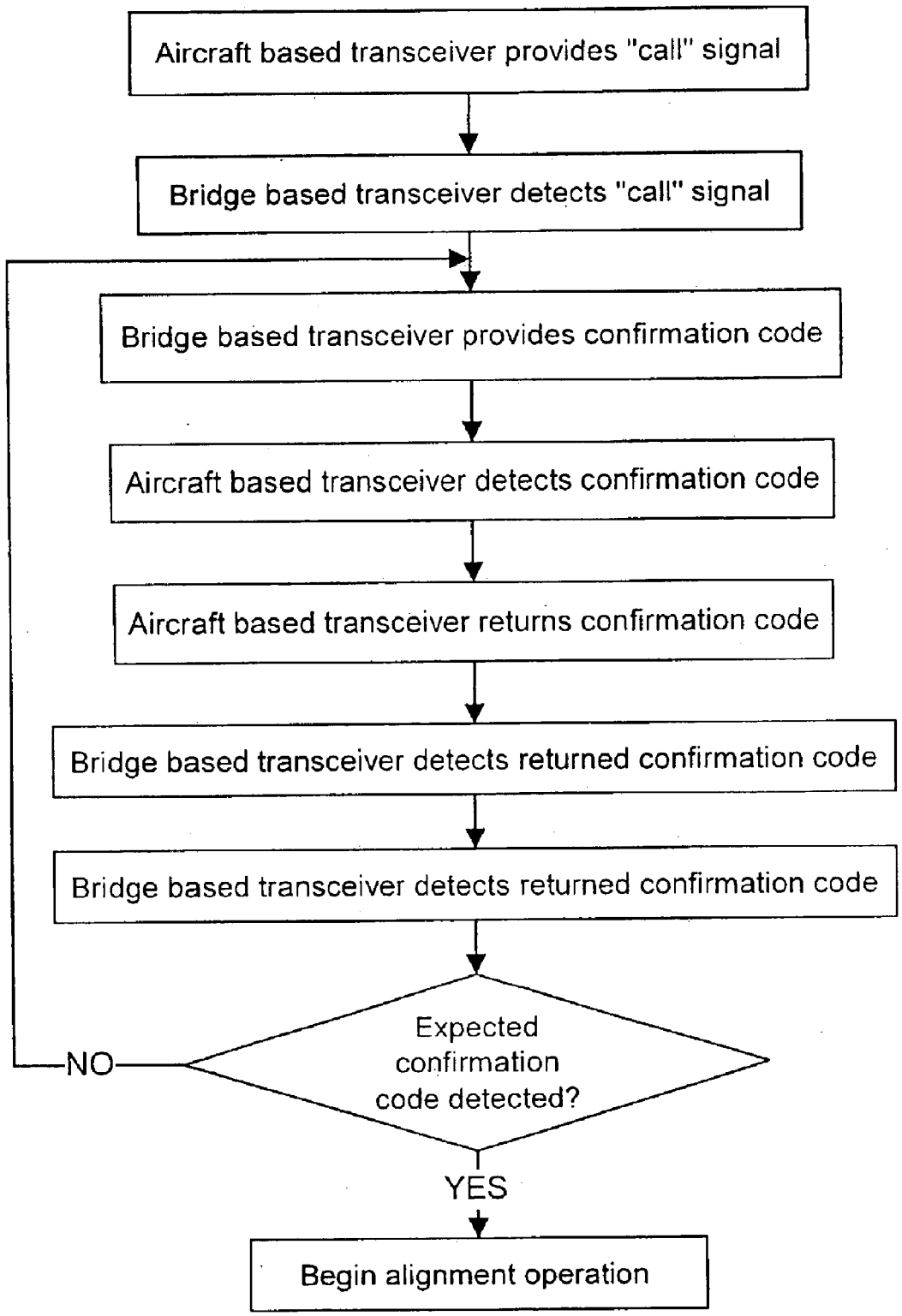
FIG. 20 is a flow diagram of a method of confirming the authenticity of a "call" signal received by a passenger boarding bridge based transceiver unit, according to yet another embodiment of the instant invention.

Referring now to FIG. 20, shown is a flow diagram of a method of confirming the authenticity of a "call" signal received by the transceiver unit aboard the passenger boarding bridge 1, according to yet another embodiment of the instant invention. The aircraft based transceiver unit provides a "call" signal, which is optionally one of a generic "call" signal and a class specific "call" signal. The "call" signal is provided either as the aircraft approaches the passenger boarding bridge, or after the aircraft has come to a stop adjacent the passenger boarding bridge. Upon detecting the "call" signal, the bridge based transceiver unit provides a confirmation code for reception by the aircraft based transceiver unit. If the aircraft based transceiver unit is actively calling for the passenger boarding bridge then, upon detecting the provided confirmation code, the aircraft based transceiver unit returns the confirmation code to the bridge based transceiver unit. The bridge based transceiver unit detects the returned confirmation code and, if the expected confirmation code has been returned, bridge alignment proceeds as normal. If the expected confirmation code is not detected, then the bridge re-transmits the confirmation code, or optionally returns an error message and calls for a human operator to manually complete the alignment operation.

The method according to FIG. 20 allows the bridge based transceiver unit to confirm that a detected "call" signal is authentic. For instance, a bridge based transceiver unit that is adapted to detect optical signals may mistake an ambient light source, such as for instance sunlight reflected off of a windshield or a flashing light of an emergency vehicle, for a call signal from an aircraft based transceiver. Of course, unexpected movement of the passenger boarding bridge in response to such ambient light signals could put airport personnel and/or equipment at risk. Advantageously, the method of FIG. 20 requires confirmation from a genuine aircraft based transceiver unit before the bridge begins to move. Further advantageously, if more than one bridge based transceiver unit detects the "call" signal, then the aircraft based transceiver unit will receive a corresponding number of confirmation requests. When the aircraft based transceiver unit becomes "aware" that plural bridges have responded to the "call" signal, then a further exchange of signals is performed in order to resolve the conflict, and to ensure that only the desired passenger boarding bridge or bridges begin alignment operations.

Figure 21:
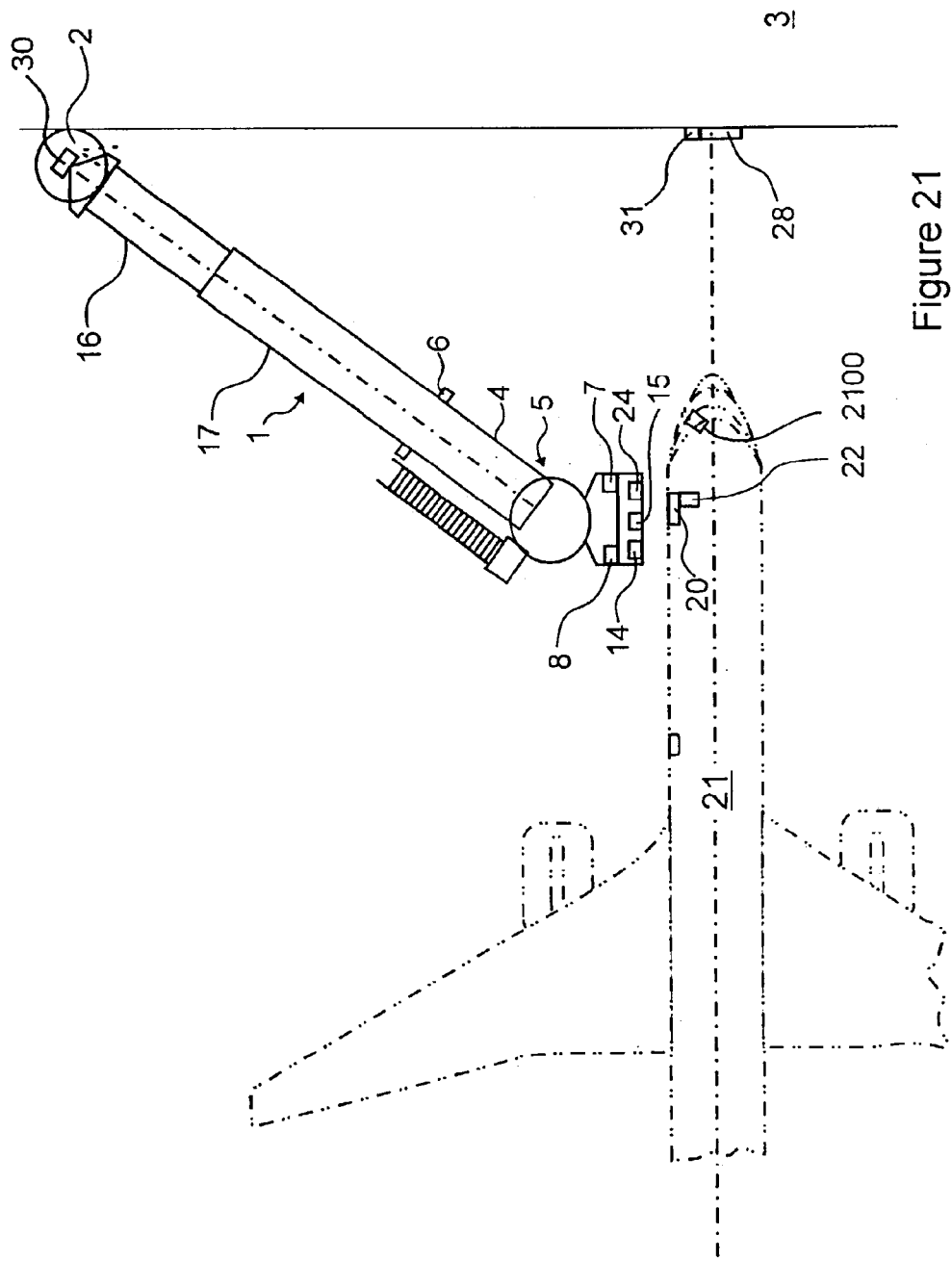
FIG. 21 is a top view schematic diagram of a passenger boarding bridge according to an embodiment of the invention docking with an aircraft having a controller for controlling the passenger boarding bridge.

Referring to FIG. 21, a seventh embodiment of the invention is shown. Elements labeled with the same numerals have the same function as those illustrated in FIG. 1. Aircraft 21 includes a transceiver 22 for transmitting one of an optical signal and an RF signal and for receiving one of an optical signal and an RF signal. Preferably, the transceiver 22 is disposed within a window (not shown) of the doorway 20 to which a passenger boarding bridge 1 is to be connected. The transceiver 22 is intended for use only during the aircraft docking and passenger boarding bridge alignment operations. The transceivers 22 are in communication with a control module 2100. The control module 2100 conveniently allows a member of the flight crew of the aircraft to provide a signal to the transceiver 22. The transceiver 22 then provides a control signal to the passenger boarding bridge 1. Passenger boarding bridge 1 includes a transceiver 24, for receiving the one of an optical signal and an RF signal transmitted from the aircraft mounted transceiver 22 and for transmitting the one of an optical signal and an RF signal to be received by the transceiver 22 of aircraft 21. Accordingly, two-way communication occurs between the aircraft 21 and the passenger boarding bridge 1, which permits the implementation of active methods of alignment. In this embodiment, a member of the flight crew provides an input signal to the control module 2100 indicative of one of: a docking request, an undocking request and an emergency stop. A signal is provided from the control module 2100 to the aircraft mounted transceiver 22. The transceiver 22 then transmits the instruction signal to the transceiver 24 mounted on the bridge 1. Additionally, a homing signal is also provided from the transceiver 22. The transceiver 24 mounted to the bridge 1 is for providing signals indicative of a state of the bridge 1. Example states of the bridge include: awaiting instruction, docking in progress, docking complete, undocking in progress, undocking complete, error: unable to dock.

Figure 22:
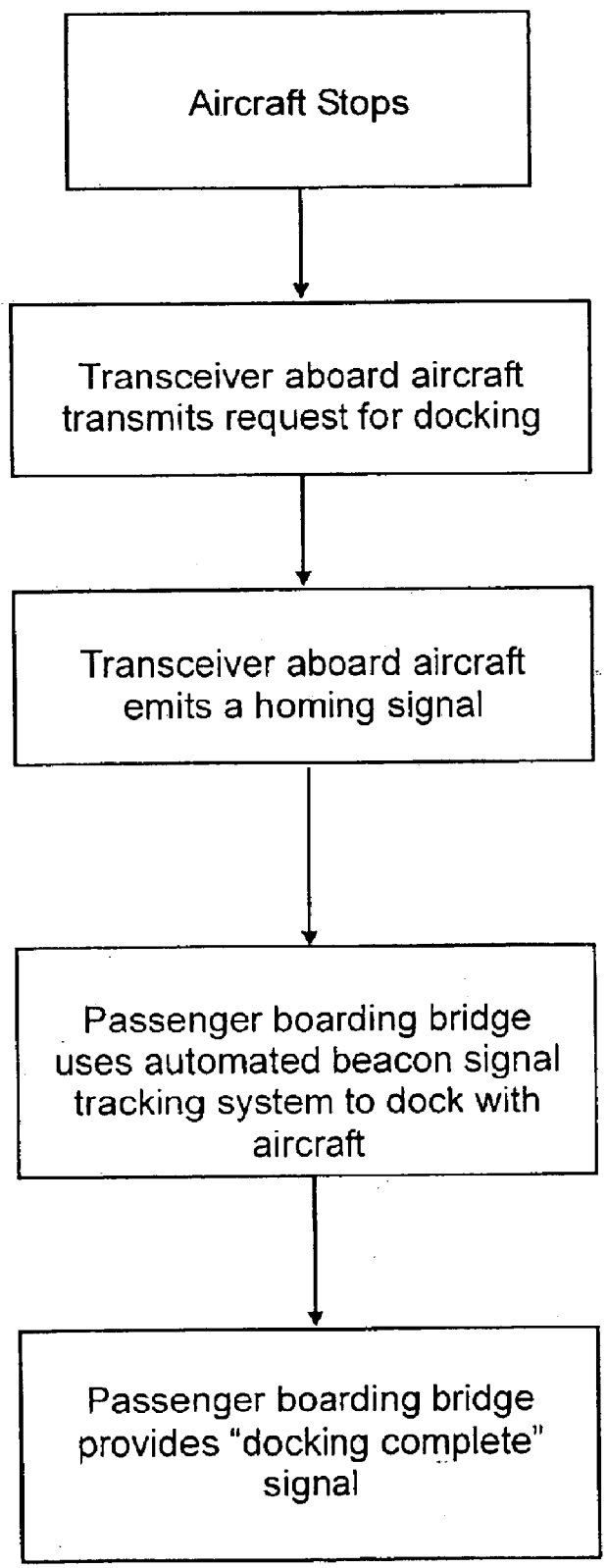
FIG. 22 is a block diagram of method of controlling a passenger boarding bridge remotely; and, FIG. 23 is a top view schematic diagram of an aircraft having two doorways, separate passenger boarding bridges are shown in close proximity to the doorways, each of the passenger boarding bridges for being controlled with a controller located on board the aircraft.

Referring to FIG. 22, a flow chart is provided indicative of the steps associated with the use of the seventh embodiment of the invention. Specifically, the aircraft stops proximate the bridge, a member of the flight crew aboard the aircraft activates the aircraft transceiver. The transceiver provides a signal to the bridge indicative of the type of aircraft, the class of the aircraft and a request to initiate an automated docking sequence. The aircraft transceiver emits a homing signal that is useable by a transceiver on the bridge to determine the position and angle of the bridge relative to the aircraft. Clearly, using such a system it is not necessary for the aircraft to stop at an exact location. When the aircraft stops at a position that is somewhat displaced from the ideal docking position the homing signal from the aircraft is used to position the bridge relative to the position of the door of aircraft. Once the bridge has successfully docked, a docking complete signal is provided from the bridge transceiver to the aircraft transceiver thereby informing the aircraft flight crew that it is safe to open the door to the bridge. Later, when the aircraft is ready to depart, a member of the flight crew aboard the aircraft causes the aircraft transceiver to provide an undocking request. The bridge transceiver receives this signal, the bridge begins an undocking procedure and the bridge transceiver emits an "undocking in progress" signal. Since a bridge provided according to this embodiment of the invention does not typically use a human operator it is convenient for the bridge to provide a signal to the aircraft transceiver in the event that the diagnostic test of the bridge reveals a problem. For example, a bridge made according to this embodiment of the invention uses a wheel to support the weight of the bridge. A member of the flight crew provides a "docking request" instruction to the bridge. The bridge acknowledges the instruction and begins approaching the aircraft. Unfortunately, the member of the flight crew fails to notice an obstruction on the ground near the aircraft. When the bridge is extending to meet the aircraft the wheel interferes with the obstruction. Upon sensing the interference, the bridge provides an error signal to the transceiver of the aircraft. The member of the flight crew is then able to contact airport support staff to investigate and rectify the problem.

Figure 23:
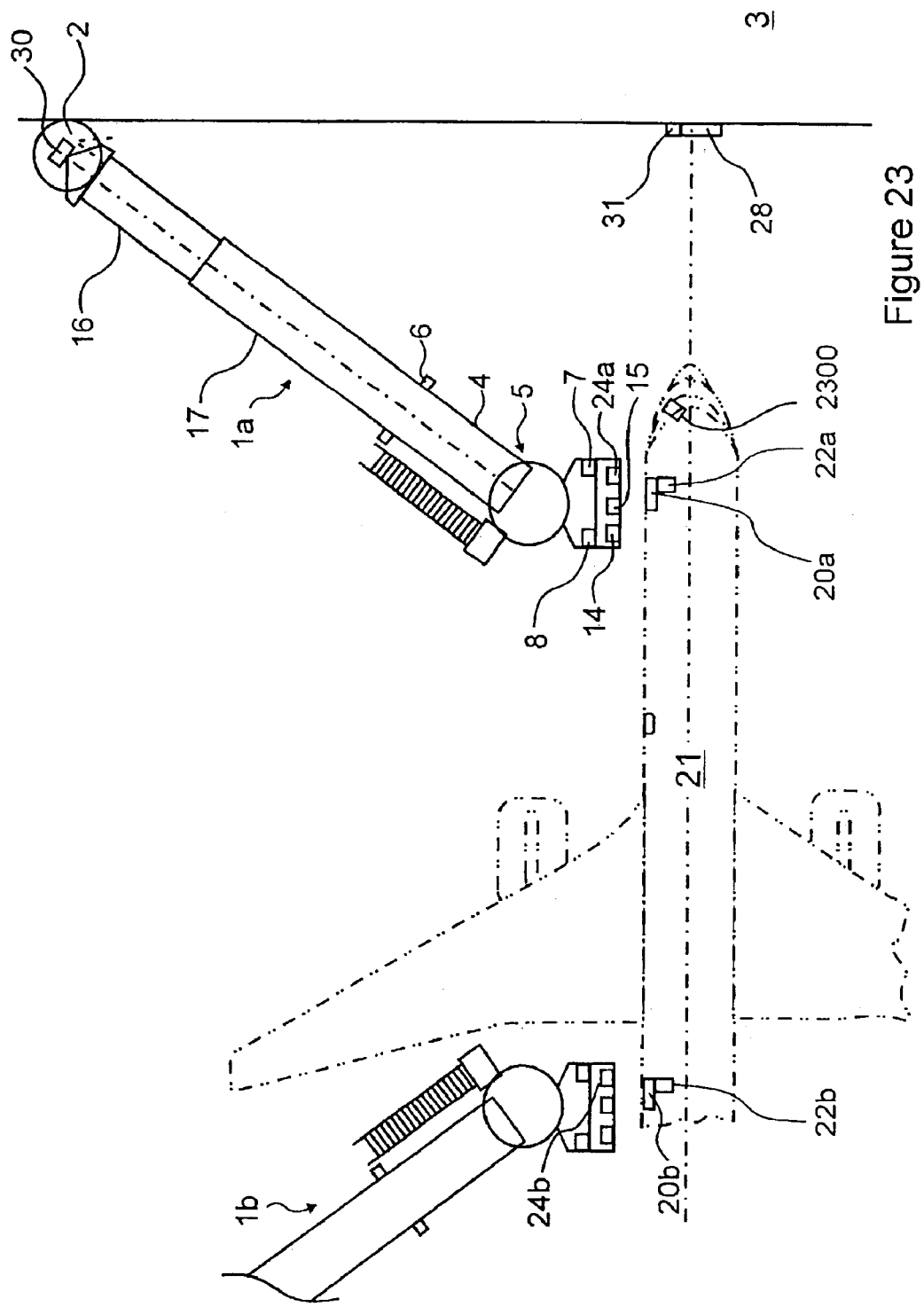

Referring to FIG. 23, a eighth embodiment of the invention is shown. Elements labeled with the same numerals have the same function as those illustrated in FIG. 1. Aircraft 21 a includes transceivers 22a and 22b, each for transmitting one of an optical signal and an RF signal and each for receiving one of an optical signal and an RF signal. Preferably, each of the transceivers 22a and 22b is disposed within a window (not shown) of a corresponding doorway 20a and 20b. Passenger boarding bridges 1a and 1b are provided for docking to doorways 20a and 20b respectively. Each of the passenger boarding bridges 1a and 1b include a transceiver 24a and 24b respectively, for receiving the one of an optical signal and an RF signal transmitted from the aircraft 21 and for transmitting the one of an optical signal and an RF signal to be received by the transceivers 22a and 22b of aircraft 21. A control module 2300 is provided in the cockpit thereby permitting a member of the flight crew, henceforth referred to as the pilot, to provide instructions to the transceivers 22a and 22b. An input port on the control module permits different modes of operation. In a first mode of operation, each of the transceivers 22a and 22b is operated independently, thus while a first transceiver 22a is controlled to provide a request docking instruction to passenger boarding bridge 1a, another transceiver 22b provides a request undocking instruction to passenger boarding bridge 1b. In second mode of operation the pilot designates which transceivers of the set of transceivers 22a and 22b are to be controlled and which are to remain inactive. When the transceivers 22a and 22b are activated they provide a signal indicative of the aircraft class and the location of the doorway corresponding to the transmitting transceiver. This information is sufficient to determine a path for the passenger boarding bridge that will permit it to dock with the aircraft without inadvertently colliding with the aircraft, provided such a path exists. Thus, a properly configured passenger boarding bridge will automatically adjust to the correct height of the doorway and dock with the doorway automatically and safely. A person of skill in the art will perceive that this embodiment of the invention is useable with any suitable number of doorways and passenger boarding bridges. Clearly, when the number of doorways of an aircraft is large it is convenient to provide a display with the controller. The display assists the pilot in recognizing, for example, which of the doorways have an aircraft boarding bridge in a position to permit docking, the status of the aircraft boarding bridge, the status of the transceivers 22a and 22b, error signals and other status indications. It is suggested that the data display be an array of light emitting diodes with a transparent overlay representative of the geometry of the aircraft disposed thereon however this need not be the case as numerous other configurations of the data display are easily envisioned by a person of skill in the art. Additionally, as the transceivers 22a, 22b, 24a and 24b are all in communication with the control module 2300 it is a simple matter to provide a feed back signal to the passenger boarding bridge. Thus, the data display of the control module 2300 optionally indicates the perceived distance between the passenger boarding bridge and the aircraft doorway. In this way a displacement feedback loop has been formed using the status signal.

Embodiments of the invention described hereinbefore make use of a transmitter aboard an aircraft and a receiver aboard a passenger boarding bridge to assist in the alignment of the passenger boarding bridge relative to the aircraft. The data provided from the transmitter need not be limited to simple docking instructions. For example, information regarding the aircraft model and version is transmitted along with data indicative of the position of a passenger doorway of the aircraft relative to the location of the transmitter. Additionally, the transmitter optionally provides data indicative of the flight number, the airline and the number of passengers aboard the flight. This data is useful to the management of the airport as the airlines are often billed for their use of the terminal and the number of passengers that they service. Thus, the data is easily calculated at the time when the passengers are moving between the airport and the aircraft.

Numerous other embodiments may be envisaged without departing from the spirit and scope of the invention.

What is claimed is:

1. A method of remotely controlling a passenger boarding bridge from an aircraft having a doorway, comprising:

providing an input signal via a control module disposed aboard the aircraft to at least one transmitter, the at least one transmitter also disposed aboard the aircraft;

transmitting a first electromagnetic signal forming a beacon and a second electromagnetic signal for providing control signal information using the at least one transmitter, the control signal information relating to the provided input sianal, and the beacon for indicating an origin thereof, a location of said origin for use in aligning the passenger boarding bridge with the doorway of the aircraft, the location being a known location within the aircraft;

receiving the beacon and the second electromagnetic signal using at least one receiver disposed at a location remote from the at least one transmitter; and, displacing an aircraft docking end of the passenger boarding bridge in dependence upon the received beacon and the control signal information, wherein the at least one receiver is not disposed on the aircraft.

2. A method according to claim 1, comprising determining a displacement in dependence upon the received beacon, and wherein displacing is performed in dependence upon the determined displacement.

3. A method according to claim 1, wherein transmitting comprises providing a beacon from a first transmitter of the at least one transmitter and providing control signal information from a second transmitter of the at least one transmitter.

4. A method according to claim 1, wherein transmitting involves providing a beacon, the beacon for providing control signal information.

5. A method according to claim 1, wherein receiving the beacon comprises using a first receiver of the at least one receiver and receiving control signal information comprises using a second receiver of the at least one receiver.

6. A method according to claim 1, comprising:

providing a first status signal indicative of one of a state of the at least one transmitter and a state of the at least one receiver, the first status signal provided to a controller;

receiving the first status signal at the controller; and, providing an indication based on the first status signal.

7. A method according to claim 6, wherein the first status signal is indicative of a state of the at least one transmitter.

8. A method according to claim 6, wherein the first status signal is indicative of a state of the at least one receiver.

9. A method according to claim 7, comprising providing a second status signal indicative of a state of the at least one receiver.

10. A method according to claim 6, wherein providing an indication comprises providing visual information on a data display.

11. A method according to claim 6, wherein the indication is an indication relating to a failure state of the one of the at least one transmitter and the at least one receiver.

12. A method according to claim 11, wherein the indication is in a human intelligible form.

13. A method according to claim 1, wherein the control signal includes an instruction corresponding to at least one of align bridge, retract bridge, and stop bridge control information.

14. A method according to claim 1, wherein the at least one transmitter and the at least one receiver form a feedback loop in dependence upon control signal information and determined displacement wherein the determined displacement is transmitted from the at least one receiver to the at least one transmitter.

15. A method according to claim 1, wherein the at least one receiver comprises a receiver disposed on the passenger boarding bridge.

16. A method according to claim 1, wherein the at least one transmitter is disposed in a window of the aircraft, the window proximate the doorway of the aircraft.

17. A method according to claim 1, wherein the at least one transmitter is disposed in a window of the aircraft, the window within the doorway of the aircraft.

18. A method according to claim 1, wherein the at least one receiver is disposed on the passenger boarding bridge.

19. A method according to claim 1, comprising transmitting a third electromagnetic signal for providing data relating to at least one of a type of aircraft; a location of the at least one transmitter relative to a doorway; a flight number; a number of passengers; and, an airline identifier.

20. A method according to claim 1, comprising transmitting a third electromagnetic signal for providing data relating to a type of aircraft; a location of the at least one transmitter relative to a doorway; a flight number; a number of passengers; and, an airline identifier.

* * * * *